United States Patent
Unuma et al.

(10) Patent No.: US 12,530,867 B2
(45) Date of Patent: Jan. 20, 2026

(54) ACTION RECOGNITION SYSTEM

(71) Applicant: Hitachi Construction Machinery Co., Ltd., Tokyo (JP)

(72) Inventors: Munetoshi Unuma, Tokyo (JP); Lu Han, Tokyo (JP); Hiroshi Tsukui, Tsuchiura (JP); Kouji Fujita, Tsuchiura (JP); Kenichi Ajima, Tsuchiura (JP); Masutaka Kumasaka, Tsuchiura (JP); Kouichirou Ejiri, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 366 days.

(21) Appl. No.: 18/023,199

(22) PCT Filed: Nov. 11, 2021

(86) PCT No.: PCT/JP2021/041628
§ 371 (c)(1),
(2) Date: Feb. 24, 2023

(87) PCT Pub. No.: WO2022/113764
PCT Pub. Date: Jun. 2, 2022

(65) Prior Publication Data
US 2023/0316711 A1   Oct. 5, 2023

(30) Foreign Application Priority Data

Nov. 25, 2020   (JP) .................................. 2020-194835

(51) Int. Cl.
*G06V 10/44* (2022.01)
*G06F 3/14* (2006.01)
(Continued)

(52) U.S. Cl.
CPC .............. *G06V 10/764* (2022.01); *G06F 3/14* (2013.01); *G06T 7/70* (2017.01); *G06T 13/20* (2013.01); *G06V 10/44* (2022.01); *G06V 10/762* (2022.01)

(58) Field of Classification Search
CPC .... G06V 10/764; G06V 10/762; G06V 10/44; G06F 3/14; G06T 13/20
See application file for complete search history.

(56) References Cited

U.S. PATENT DOCUMENTS

2003/0197703 A1 * 10/2003 Takakura ................ G06T 13/00
                                                                                345/473
2005/0157908 A1 *  7/2005 Matsugu ................. G06V 20/00
                                                                                382/107
(Continued)

FOREIGN PATENT DOCUMENTS

EP    2 530 209 A1   12/2012
JP    2005-202653 A   7/2005
(Continued)

OTHER PUBLICATIONS

Extended European Search Report issued in European Application No. 21897738.7 dated Sep. 24, 2024 (9 pages).
(Continued)

*Primary Examiner* — Shaghayegh Azima
(74) *Attorney, Agent, or Firm* — Crowell & Moring LLP

(57) ABSTRACT

An action recognition system includes a controller that computes, in a time division manner, a plurality of feature vectors using as feature quantities information of a machine with respect to running that varies in a time sequence, generates a classification model by classifying the feature vectors into a plurality of clusters and allocating identification IDs to the clusters, generates an ID pattern model by allocating the identification IDs to the feature vectors computed in the time division manner on the basis of the (Continued)

classification model and associating a pattern of the identification IDs that vary in a time sequence according to a predetermined action of the machine with identification information of the predetermined action, generates output information for recognizing the predetermined action on the basis of changes in the identification IDs in the time sequence and the ID pattern model, and controls the display device to output the output information.

12 Claims, 26 Drawing Sheets

(51) Int. Cl.
*G06T 7/70* (2017.01)
*G06T 13/20* (2011.01)
*G06V 10/762* (2022.01)
*G06V 10/764* (2022.01)

(56) References Cited

U.S. PATENT DOCUMENTS

| | | | | |
|---|---|---|---|---|
| 2012/0317444 | A1* | 12/2012 | Suzuki | E02F 9/267 714/39 |
| 2017/0328031 | A1* | 11/2017 | Jang | E02F 9/265 |
| 2019/0218749 | A1* | 7/2019 | Hiromatsu | E02F 9/26 |
| 2020/0050890 | A1* | 2/2020 | Aizawa | G06V 10/82 |
| 2020/0082156 | A1* | 3/2020 | Dehghan | H04N 23/611 |

FOREIGN PATENT DOCUMENTS

| | | |
|---|---|---|
| JP | 2007-187555 A | 7/2007 |
| JP | 2017-156978 A | 9/2017 |
| JP | 2019-87200 A | 6/2019 |
| JP | 2020-38440 A | 3/2020 |

OTHER PUBLICATIONS

International Search Report (PCT/ISA/210) issued in PCT Application No. PCT/JP2021/041628 dated Jan. 25, 2022 with English translation (five (5) pages).
Japanese-language Written Opinion (PCT/ISA/237) issued in PCT Application No. PCT/JP2021/041628 dated Jan. 25, 2022 (three (3) pages).
International Preliminary Report on Patentability (PCT/IB/338 & PCT/IB/373) issued in PCT Application No. PCT/JP2021/041628 dated Jun. 8, 2023, Including English translation of document C2 (Japanese-language Written Opinion (PCT/ISA/237), filed on Feb. 24, 2023) (5 pages).

* cited by examiner

FIG. 3

MULTIDIMENSIONAL
COLLECTED DATA TABLE 117

| TIME | Pb | Pr | Lb | α | To |
|---|---|---|---|---|---|
| 12:25:32 | 10.5 | 1.0 | 20 | 45 | 20.5 |
| 12:25:33 | 11.5 | 2.0 | 20 | 45.5 | 20.5 |
| 12:25:34 | 10.6 | 1.5 | 20 | 45 | 20.5 |
| ... | ... | ... | ... | ... | ... |
| ... | ... | ... | ... | ... | ... |
| ... | ... | ... | ... | ... | ... |

FIG. 5

FEATURE QUANTITY DATA TABLE 176

| TIME | Fb | f | α | To |
|---|---|---|---|---|
| 12:25:32 | 3.0 | 20 | 45 | 20.5 |
| 12:25:33 | 3.0 | 20 | 45.5 | 20.5 |
| 12:25:34 | 3.0 | 20 | 45 | 20.5 |
| ... | ... | ... | ... | ... |
| ... | ... | ... | ... | ... |
| ... | ... | ... | ... | ... | t2a

FIG. 6

CLASSIFICATION MODEL                                    175

| IDENTIFICATION ID | Fb    | f    | α    | To   |
|---|---|---|---|---|
| 1 | 3.0 | 20.2 | 45 | 20.5 |
| 2 | 20.0 | 1.2 | 10.5 | 15.2 |
| 3 | −10.2 | 11.5 | 1.5 | −1.2 |
| ... | ... | ... | ... | ... |
| ... | ... | ... | ... | ... |
| ... | ... | ... | ... | ... |
| k | 3.0 | 20.1 | 30 | 20.1 |

REPRESENTATIVE FEATURE VECTOR

FIG. 8

IDENTIFICAION ID TABLE

| TIME | IDENTIFICATION ID |
|---|---|
| 12:25:32 | 92 |
| 12:25:33 | 203 |
| 12:25:34 | 203 |
| 12:25:35 | 70 |
| 12:25:36 | 70 |
| 12:25:37 | 70 |
| 12:25:38 | 203 |
| 12:25:39 | 203 |
| 12:25:40 | 16 |
| ... | ... |
| ... | ... |
| ... | ... |

ACTION DATA TABLE    118

| START TIME | END TIME | ACTION NAME |
|---|---|---|
| 12:25:33 | 12:25:39 | ACTION A |
| 12:25:40 | 12:25:46 | ACTION B |
| 12:25:48 | 12:26:05 | ACTION C |
| ... | ... | ... |
| ... | ... | ... |
| ... | ... | ... |

FIG. 10

IDENTIFICAION ID TABLE

| TIME | IDENTIFI-CATION ID |
|---|---|
| 12:25:32 | 92 |
| 12:25:33 | 203 |
| 12:25:34 | 203 |
| 12:25:35 | 70 |
| 12:25:36 | 70 |
| 12:25:37 | 70 |
| 12:25:38 | 203 |
| 12:25:39 | 203 |
| 12:25:40 | 16 |
| ... | ... |
| ... | ... |
| ... | ... |
| ... | ... |
| ... | ... |

185

ID PATTERN MODEL 184

| ACTION NAME | REGISTERED ID PATTERN | | |
|---|---|---|---|
| ACTION A | 203 | 70 | 203 |
| ACTION B | ... | ... | ... |
| ACTION C | ... | ... | ... |
| ... | ... | ... | ... |
| ... | ... | ... | ... |

FIG. 13

(a) REGISTERED ID PATTERN

「5」→「7」→「10」

(b) WHEN SAME IDENTIFICATION ID IS REPEATED

「5」「5」「5」⟶「7」「7」「7」「7」⟶「10」   ⇒   「5」→「7」→「10」

EXAMPLE OF COST COMPUTATION (c) 「5」⟶「7」⟶「10」   ⟹   COST: C0

(d) 「5」⟶「7」⟶「8」⟶「10」   ⟹   COST: C1

(e) 「5」⟶「9」⟶「10」   ⟹   COST: C2

ACTION RECOGNITION SYSTEM

TECHNICAL FIELD

The present invention relates to an action recognition system.

BACKGROUND ART

For efficiently making machines act, it is effective to appropriately recognize the action of the machines. As a system for recognizing action, there is known an action recognition system that recognizes action on the basis of information from a plurality of acceleration sensors (see Patent Document 1).

According to the system disclosed in Patent Document 1, data from the acceleration sensors are segmented in a predetermined time duration, feature quantity vectors are determined that have elements representing the degrees of similarity between the segmented data and a plurality of standard change patterns prepared in advance, the feature quantity vectors are combined into a vector representing feature data, the degree of similarity is determined between the feature data and data representative of feature data from a sample observation belonging to a partial action in an action dictionary, and a label allocated to representative data whose degree of similarity is high is allocated to the feature data. According to the system disclosed in Patent Document 1, each time a label is allocated to the feature data, matching is performed on a label string allocated to feature data from actual observations performed so far and a label string of partial actions in the action dictionary to recognize a sample action whose likelihood in the action dictionary is high as an action in the environment at the time.

PRIOR ART DOCUMENT

Patent Document

Patent Document JP-2007-187555-A

SUMMARY OF THE INVENTION

Problems to be Solved by the Invention

According to the system disclosed in Patent Document 1, a partial action included in a sample action is extracted from a string of feature data from a sample observation, and a label (movement, seating, unseating, etc.) as a natural-language-like name is allocated to the extracted partial action. According to the system disclosed in Patent Document 1, it is necessary to produce in advance a table for allocating a label as a natural-language-like name to a partial action. When labels are to be established for respective partial actions, it is tedious and time-consuming to produce a table, possibly resulting in an increase in the cost of manufacturing the system.

It is an object of the present invention to provide an action recognition system that can be manufactured at a reduced cost.

Means for Solving the Problems

An action recognition system according to an aspect of the present invention includes a display device that displays information and a controller that acquires information of a machine with respect to running that varies in a time sequence, generates output information for recognizing an action of the machine on the basis of the information of the machine, and controls the display device to output the output information. The controller is configured to be able to execute a classification model generating process for generating a classification model by computing, in a time division manner, a plurality of feature vectors using as feature quantities the information of the machine that varies in a time sequence, classifying the feature vectors computed in the time division manner into a plurality of clusters, and allocating identification IDs to the clusters, an ID pattern model generating process for generating an ID pattern model by computing, in a time division manner, a plurality of feature vectors using as feature quantities the information of the machine that varies in a time sequence, allocating the identification IDs to the feature vectors computed in the time division manner on the basis of the classification model, and storing a pattern of the identification IDs that vary in a time sequence according to a predetermined action of the machine in association with identification information of the predetermined action, and an information outputting process for computing, in a time division manner, a plurality of feature vectors using as feature quantities the information of the machine that varies in a time sequence, allocating the identification IDs to the feature vectors computed in the time division manner on the basis of the classification model, generating output information for recognizing the predetermined action on the basis of changes in the identification IDs in a time sequence and the ID pattern model, and controlling the display device to output the output information.

Advantage of the Invention

According to the present invention, there is provided an action recognition system that can be manufactured at a reduced cost.

BRIEF DESCRIPTION OF THE DRAWINGS

FIG. 3 is a diagram illustrating an example of a multidimensional collected data table.

FIG. 5 is a diagram illustrating an example of a feature quantity data table.

FIG. 6 is a diagram illustrating an example of a classification model.

FIG. 8 is a diagram illustrating an example of an identification ID table.

FIG. 9 is a diagram illustrating an example of an action data table.

FIG. 10 is a diagram explanatory of an ID pattern extracting process.

FIG. 13 is a diagram explanatory of features of DP matching.

MODES FOR CARRYING OUT THE INVENTION

Action recognition systems according to embodiments of the present invention will be described below with reference to the drawings.

First Embodiment

Figure 1:
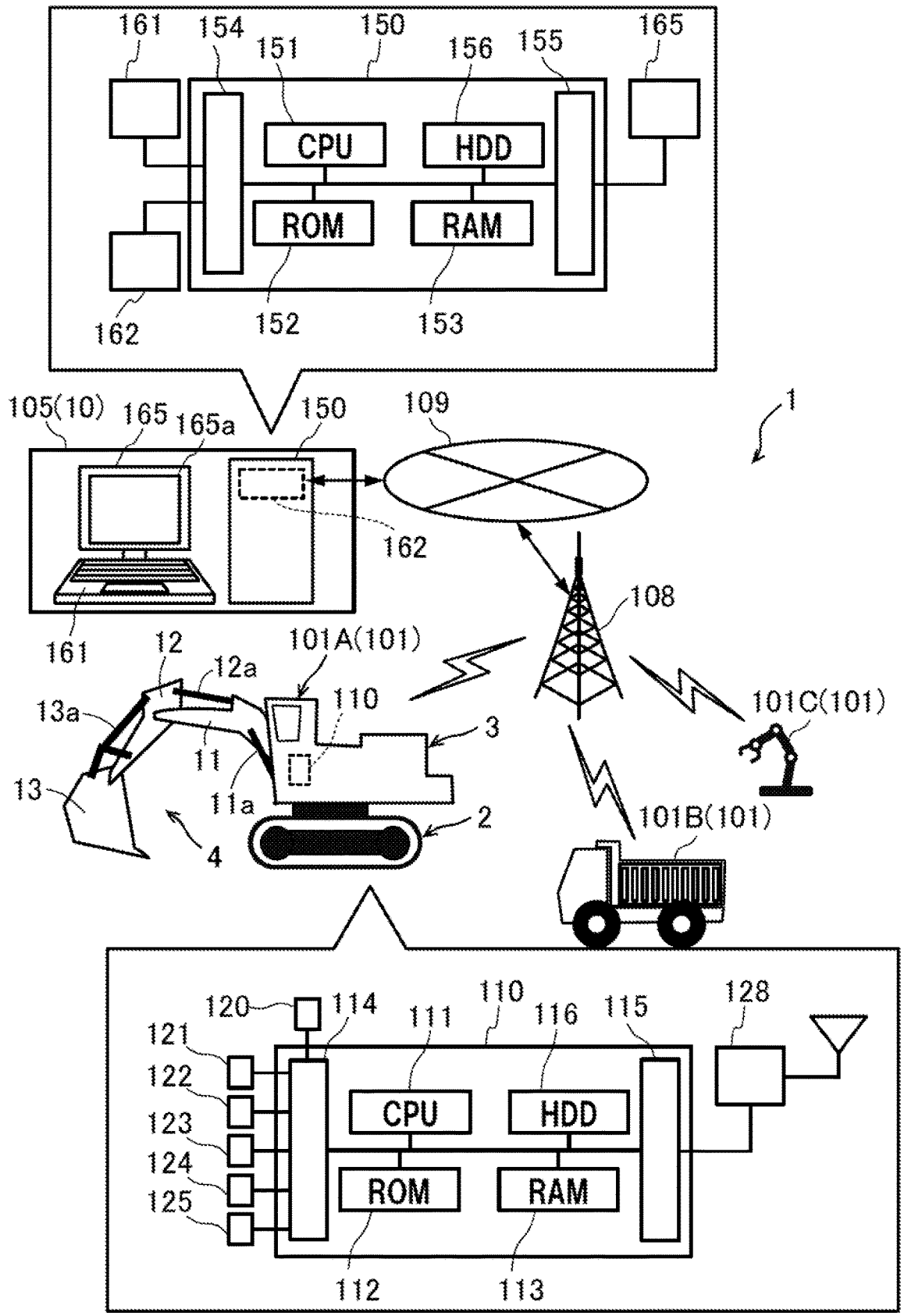
FIG. 1 is a diagram illustrating the configuration of a management system for a work machine.

An action recognition system according to a first embodiment of the present invention will be described below with reference to FIGS. 1 through 15. FIG. 1 is a diagram illustrating the configuration of a management system 1 for a work machine. The management system 1 includes a management apparatus 105 for managing a work machine 101 that performs a work at a work site and the work machine 101 such as a hydraulic excavator 101A, a dump truck 101B, or a work robot 101C for performing the work at the work site.

The hydraulic excavator 101A serves as the work machine 101 that includes a track structure 2, a swing structure 3 swingably mounted on the track structure 2, and a multi-joint work implement 4 installed at the swing structure 3. The work implement 4 has a boom 11, an arm 12, a bucket 13, and hydraulic cylinders (a boom cylinder 11a, an arm cylinder 12a, and a bucket cylinder 13a) for driving them. The dump truck 101B also serves as the work machine 101 that includes a track structure, a work implement having a cargo bed (vessel) mounted on the track structure for being loaded with a cargo and a hydraulic cylinder for vertically pivoting (luffing) the cargo bed. The work robot 101C also serves as the work machine 101 including a work implement having a multi-joint arm and a gripper for gripping objects.

The management apparatus 105 is an external apparatus for remotely managing (recognizing, monitoring) the state of the work machine 101. The management apparatus 105 is installed in, for example, a facility such as the home office, a branch office, or a factory of the manufacturer (maker) of the work machine 101, a rental company for renting the work machine 101, a data center dedicated to the running of a server, or a facility of the owner of the work machine 101.

According to the first embodiment, the management apparatus 105 makes up an action recognition system 10 for recognizing action of the work machine 101 on the basis of information from the work machine 101. The work machine 101 whose action is recognized by the action recognition system 10 will be described hereinbelow primarily as the hydraulic excavator 101A by way of example.

The management system 1 is configured to allow bidirectional communication to be performed between the hydraulic excavator 101A that performs a work at a work site and the management apparatus 105 that is installed at a location remote from the work site through a communication link 109 of a wide area network. In other words, the hydraulic excavator 101A and the management apparatus 105 can transmit and receive information (data) through the communication link 109. The communication link 109 includes a cellular phone communication network (mobile communication network) set up by a cellular phone service provider, the Internet, or the like. For example, if the hydraulic excavator 101A and a wireless base station 108 are interconnected by a cellular phone communication network (mobile communication network), as illustrated, then when the wireless base station 108 receives predetermined information from the hydraulic excavator 101A, the wireless base station 108 transmits the received information to the management apparatus 105 through the Internet.

The hydraulic excavator 101A includes a machine controller 110 as a controller for controlling various parts of the hydraulic excavator 101A, an input device 120 for inputting predetermined information to the machine controller 110, a plurality of sensors 121 through 125, and a communication device 128. The communication device 128 includes a wireless communication device capable of performing wireless communication with the wireless base station 108 connected to the communication link 109, and has a communication interface including a communication antenna that has a 2.1 GHz band as its sensitivity band, for example. The communication device 128 transmits and receives information to and from a management server 150 via the wireless base station 108 and the communication link 109.

The management apparatus 105 includes the management server 150, an input device 161 for inputting predetermined information to the management server 150, a communication device 162 for receiving information (information with respect to driving of the hydraulic excavator 101A that varies in a time sequence) transmitted from the hydraulic excavator 101A, and a display device 165 as an output device for outputting predetermined information on the basis of control signals from the management server 150. The display device 165 includes a liquid crystal display device, for example, and displays a display image representing information about the state of the hydraulic excavator 101A on a display screen 165a on the basis of display control signals from the management server 150.

The management server 150 functions as a controller for outputting output information on the display device (output device) 165 by acquiring the information of the hydraulic excavator 101A that varies in a time sequence, generating, on the basis of the information of the hydraulic excavator 101A, output information with which to recognize action of the hydraulic excavator 101A, and controlling the display device (output device) 165.

The machine controller 110 and the management server 150 include respective computers including CPUs (Central Processing Units) 111, 151 as operating circuits, ROMs (Read Only Memories) 112, 152 as storage devices, RAMS (Random Access Memories) 113, 153 as storage devices, input interfaces 114, 154, output interfaces 115, 155, and other peripheral circuits. Each of the machine controller 110 and the management server 150 may include a single computer or a plurality of computers.

The ROMs 112, 152 include nonvolatile memories such as EEPROMs and store programs capable of performing various processing processes. In other words, the ROMs 112, 152 include storage mediums from which the programs for performing the functions according to the present embodiment can be read. The RAMS 113, 153 include volatile memories and function as work memories into and out of which data can directly be input and output by the CPUs 111, 151. While the CPUs 111, 152 are executing the programs to perform processing processes, the RAMS 113, 153 temporarily store necessary data. The management server 150 and the machine controller 110 further include HDDs (Hard Disk Drives) 116, 156 as storage devices. The HDDs 116, 156 include nonvolatile mass storage devices for storing various items of information (data). As described later, various data (a multidimensional collected data table 117, an action data table 118, a classification model 175, and an ID pattern model 184) are stored in the HDDs 116, 156 by way of example. However, those various data can be stored in various storage devices such as SSDs (Solid State Drives) or flash memories instead of the HDDs 116, 156.

The CPUs 111, 151 are processors for loading control programs stored in the ROMs 112, 152 into the RAMS 113, 153 and executing the control programs. The CPUs 111, 151 perform predetermined computation processes on information (data) read from the input interfaces 114, 154, the ROMs 112, 152, the RAMS 113, 153, the HDDs 115, 156, etc. according to the control programs. Signals from various devices are input to the input interfaces 114, 154, which convert the input signals into signals that enable computation by the CPUs 111, 151. The output interfaces 115, 155 generate signals to be output according to the results of the computation carried out by the CPUs 111, 151 and output the generated signals to the various devices.

Figure 2:
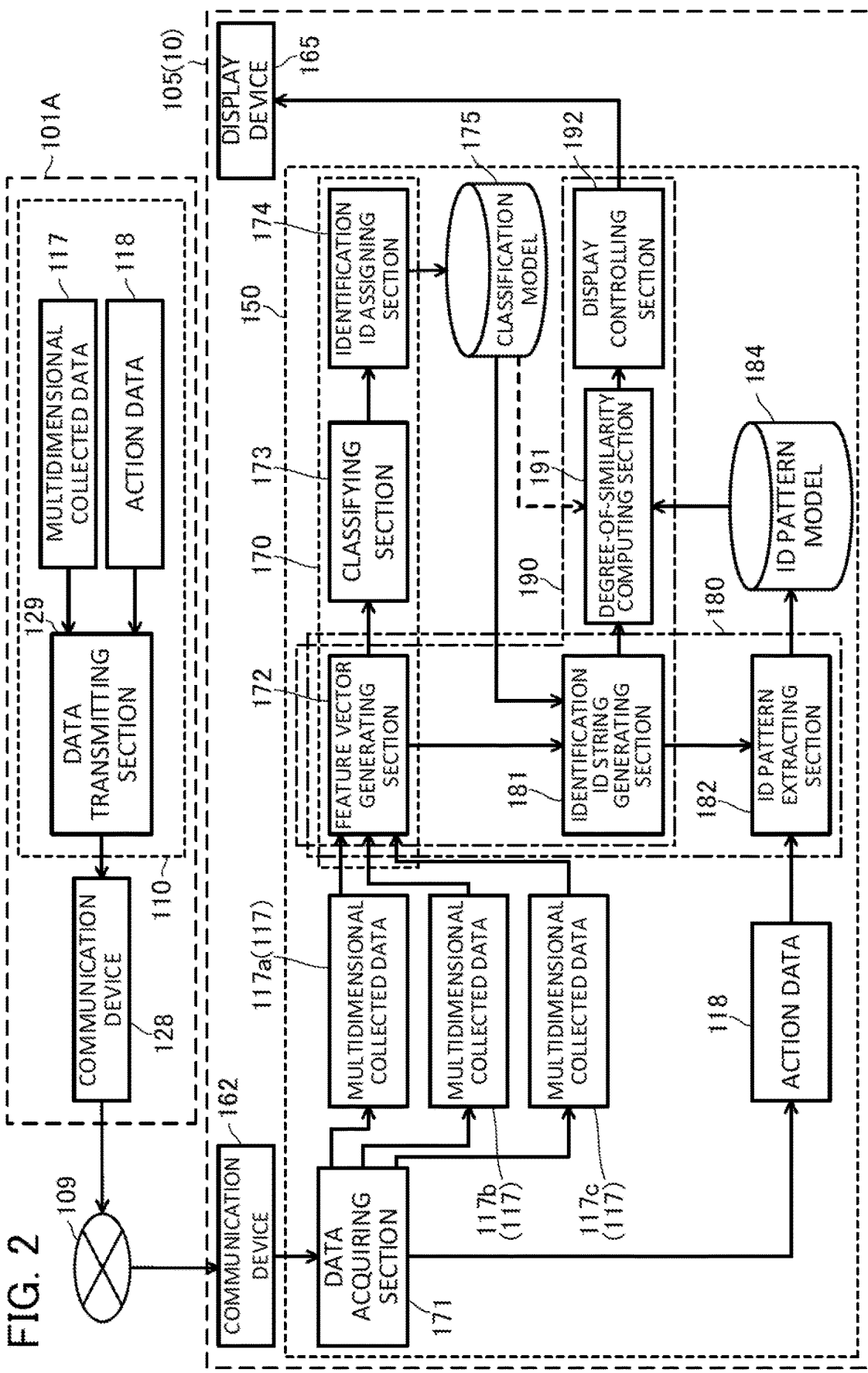
FIG. 2 is a functional block diagram of an action recognition system according to a first embodiment of the present invention.

FIG. 2 is a functional block diagram of the action recognition system 10 according to the first embodiment of the present invention. According to the first embodiment, the management apparatus 105 functions as the action recognition system 10, as described above. The action recognition system 10 acquires information (hereinafter also referred to as collected information) collected by the hydraulic excavator 101A and processes the collected information to recognize the action of the hydraulic excavator 101A that varies in a time sequence.

The collected information collected by the hydraulic excavator 101A includes sensor information sensed by the various sensors 121 through 125 on the hydraulic excavator 101A and control information of the machine controller 110 of the hydraulic excavator 101A. The machine controller 110 acquires the sensor information and the control information of the hydraulic excavator 101A repeatedly in predetermined sampling periods, stores the sensor information and the control information in the HDD 116, and generates a multidimensional collected data table 117. The multidimensional collected data table 117 includes a plurality of kinds of data (multidimensional collected information) that varies in a time sequence.

FIG. 3 is a diagram illustrating an example of the multidimensional collected data table 117. As illustrated in FIG. 3, the multidimensional collected data table 117 includes the collected information of the hydraulic excavator 101A that varies in a time sequence. Specifically, the multidimensional collected data table 117 is generated by storing in the HDD 116 a plurality of pieces of multidimensional information acquired in a time sequence at identical times in identical sampling periods together with the times at which the multidimensional information has been acquired. For an easier understanding of the collected data, although the sampling periods are illustrated as 1 [sec], actually they are in the range from about several [msec] to several tens [msec].

As illustrated in FIG. 3, the plurality of pieces of collected information in the multidimensional collected data table 117 include, for example, as sensor information, bottom pressures Pb of the boom cylinder 11a, rod pressures Pr of the boom cylinder 11a, amounts Lb of boom operation, boom angles α, and outside temperatures To.

As illustrated in FIG. 1, the boom cylinder 11a includes a hydraulic cylinder for driving the boom 11. The hydraulic cylinder includes a bottomed cylinder tube having a closed end, a head cover closing an opening in the other end of the cylinder tube, a cylinder rod inserted in the cylinder tube through the head cover, and a piston mounted on a distal end of the cylinder rod and dividing the space in the cylinder tube into a rod side chamber and a bottom side chamber. The boom cylinder 11a has an end connected to the boom 11 and the other end connected to a frame of the swing structure 3.

The hydraulic excavator 101A has a pressure sensor (bottom pressure sensor) 121 for sensing the pressure in the bottom side chamber of the boom cylinder 11a. The machine controller 110 acquires a bottom pressure Pb of the boom cylinder 11a that is sensed by the bottom pressure sensor 121. The hydraulic excavator 101A has a pressure sensor (rod pressure sensor) 122 for sensing the pressure in the rod side chamber of the boom cylinder 11a. The machine controller 110 acquires a rod pressure Pr of the boom cylinder 11a that is sensed by the rod pressure sensor 122. Although not shown, the machine controller 110 similarly acquires rod pressures and bottom pressures of the arm cylinder 12a and the bucket cylinder 13a.

The hydraulic excavator 101A has a boom operation lever for operating the boom 11 (the boom cylinder 11a) and a boom operation sensor 123 for sensing an amount of operation of the boom operation lever. The machine controller 110 acquires the amount of boom operation sensed by the boom operation sensor 123. Although not shown, the machine controller 110 similarly acquires amounts of operation of the arm 12 (the arm cylinder 12a) and the bucket 13 (the bucket cylinder 13a).

The hydraulic excavator 101A has a boom angle sensor 124 for sensing an angle through which the boom 11 is pivoted with respect to the swing structure 3. The machine controller 110 acquires a boom angle α sensed by the boom angle sensor 124. Although not shown, the machine controller 110 similarly acquires an angle (arm angle) through which the arm 12 is pivoted with respect to the boom 11 and an angle (bucket angle) through which the bucket 13 is pivoted with respect to the arm 12. The sensors for sensing the boom angle α, the arm angle, and the bucket angle configure posture sensors for sensing the posture of the work implement 4.

The hydraulic excavator 101A has a temperature sensor 125 for sensing an outside temperature To. The machine controller 110 acquires the outside temperature sensed by the temperature sensor 125. Although not shown, the machine controller 110 acquires a temperature of an engine coolant and a temperature of a hydraulic operating fluid.

Although not shown, the plurality of pieces of information that make up the multidimensional collected data table 117 include control information for controlling the hydraulic excavator 101A. The control information includes, for example, a target value for the displacement volume of a hydraulic pump (a control signal for controlling the hydraulic pump). The hydraulic excavator 101A includes a hydraulic pump driven by an engine for supplying a hydraulic operating fluid as operating fluid to hydraulic actuators including a hydraulic motor for swinging the swing structure 3, a hydraulic motor for travelling of the track structure 2, etc., and flow control valves for controlling the directions and flow rates of the hydraulic operating fluid supplied from the hydraulic pump to the hydraulic actuators.

The flow control valves act in response to an operation of operation levers. For example, the flow control valve for controlling the flow of the hydraulic operating fluid supplied to the boom cylinder 11a acts in response to an operation of the boom operation lever. When the flow control valve acts, the hydraulic operating fluid delivered from the hydraulic pump is introduced into the bottom side chamber (or the rod side chamber) of the boom cylinder 11a, and the hydraulic operating fluid is discharged from the rod side chamber (or the bottom side chamber) to a tank, extending (or contracting) the boom cylinder 11a. The boom 11 is now pivoted upwardly (or downwardly).

The hydraulic pump includes a tiltable swash plate mechanism (not shown) having a pair of inlet and outlet ports and a regulator for regulating the delivery capacity (displacement volume) of the hydraulic pump by adjusting the angle of tilt of the swash plate. The machine controller 110 computes a target value for the delivery capacity of the hydraulic pump on the basis of the delivery pressure of the hydraulic pump that is sensed by a delivery pressure sensor. The delivery pressure sensor is disposed between the hydraulic pump and the flow control valve. The machine controller 110 outputs a control signal for controlling the delivery capacity of the hydraulic pump to reach the target value to the regulator. The machine controller 110 stores the target value for the delivery capacity of the hydraulic pump as a piece of control information in the HDD 116.

As described above, the machine controller 110 acquires sensor information from the sensors installed at measurement parts on the hydraulic excavator 101A and control information in a time sequence, and stores the acquired sensor information and control information in the HDD 116. Alternately, the machine controller 110 may acquire sensor information of the hydraulic excavator 101A from another controller connected via a vehicle-mounted network such as a CAN (Controller Area Network), and store the acquired sensor information in the HDD 116. For example, the machine controller 110 may acquire information sensed by an engine speed sensor from an engine controller via a vehicle-mounted network and store the acquired information in the HDD 116.

As illustrated in FIG. 2, the machine controller 110 of the hydraulic excavator 101A functions as a data transmitting section 129 by executing the programs stored in the ROM 112. The data transmitting section 129 transmits the multidimensional collected data table 117 stored in the HDD 116 from a communication device 128 to the management apparatus 105.

The management server 150 acquires the multidimensional collected data table 117 from the hydraulic excavator 101A through the communication link 109 via a communication device 162, and stores the acquired multidimensional collected data table 117 in the HDD 156. The management server 150 of the action recognition system (management apparatus) 10 performs a process for recognizing action on the basis of the acquired multidimensional collected data table 117, the classification model 175 generated in advance, and the ID pattern model 184 generated in advance, and displays the results of the process on the display screen 165a of the display device 165.

The management server 150 of the action recognition system (management apparatus) 10 functions as a data acquiring section 171, a feature vector generating section 172, a classifying section 173, an identification ID allocating section 174, an identification ID string generating section 181, an ID pattern extracting section 182, a degree-of-similarity computing section 191, and a display controlling section 192 by executing the programs stored in the ROM 152. A process of generating the classification model 175, a process of generating the ID pattern model 184, and the process of recognizing action will be described in detail below.

First, the process of generating the classification model 175 that is performed by the management server 150 will be described in detail with reference to FIGS. 2 through 6. The management server 150 is able to execute a classification model generating process for generating a classification model 175 by computing, in a time division manner, a plurality feature vectors V using, as feature quantities, the information of the hydraulic excavator 101A that varies in a time sequence, classifying the feature vectors V computed in a time division manner into a plurality of clusters, and allocating identification IDs to the clusters.

As illustrated in FIG. 2, the data acquiring section 171 acquires a multidimensional collected data table 117 from the hydraulic excavator 101A via the communication device 162 and stores the acquired multidimensional collected data table 117 as a multidimensional collected data table 117a for learning in the HDD 156. The feature vector generating section 172 generates a feature quantity data table 176 (see FIG. 5) based on the multidimensional collected data table 117a for learning. The feature quantity data table 176 is a data table made up of a plurality of feature vectors V that have been time-divided. The classifying section 173 classifies the time-divided feature vectors V into a plurality of clusters. The identification ID allocating section 174 allocates identification IDs to respective representative feature vectors of the clusters classified by the classifying section 173, thereby generating a classification model 175. In other words, the feature vector generating section 172, the classifying section 173, and the identification ID allocating section 174 function as a classification model generating section 170 for generating a classification model 175 based on the multidimensional collected data table 117a.

Figure 4:
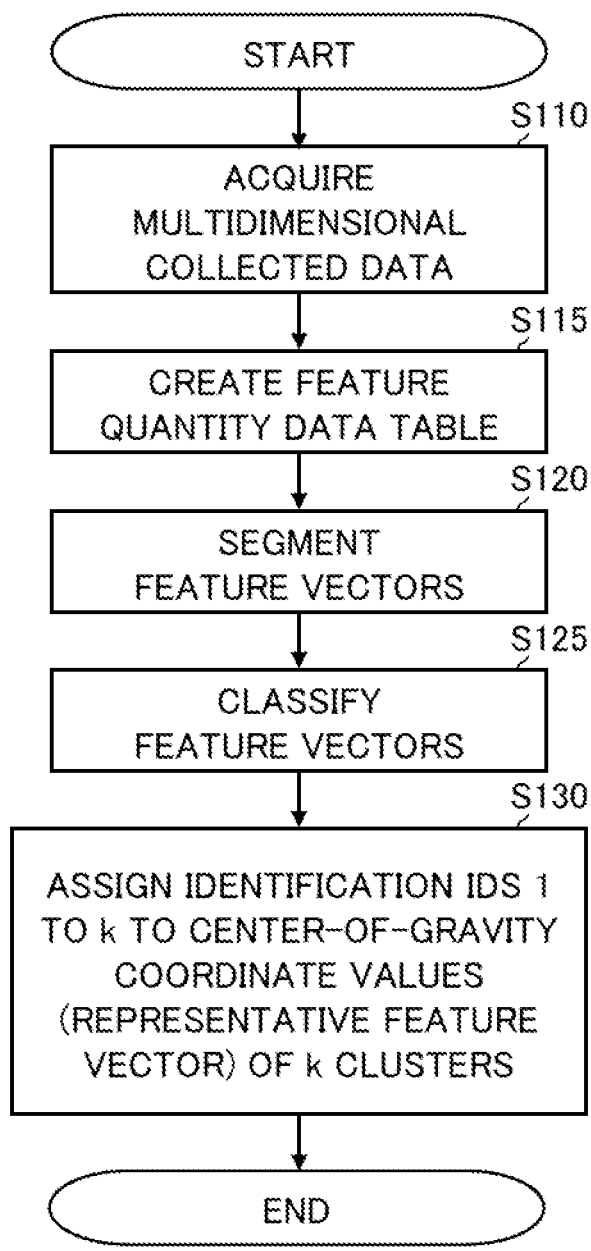
FIG. 4 is a flowchart of a classification model generating process carried out by a management server.

FIG. 4 is a flowchart of the classification model generating process executed by the management server 150. The flowchart illustrated in FIG. 4 is started when an instruction for generating a classification model is input into the management server 150 using the input device 161 of the management apparatus 105, for example.

As illustrated in FIG. 4, in step S110, the data acquiring section 171 acquires a multidimensional collected data table 117 from the hydraulic excavator 101A through the communication link 109 and stores the acquired multidimensional collected data table 117 as a multidimensional collected data table 117a for learning in the HDD 156. Then, control goes to step S115.

It is desirable that the multidimensional collected data table 117 acquired as a multidimensional collected data table 117a for learning is generated so as to be able to cover information required to recognize the action of the hydraulic excavator 101A that is expected at a work site. Therefore, the multidimensional collected data table 117 is generated from the information collected by the hydraulic excavator 101A acting according to various work contents expected in various situations at a test site beforehand.

In step S115, the feature vector generating section 172 converts predetermined information of the multidimensional collected data table 117a acquired in step S110 into feature quantities, generating a feature quantity data table 176 (see FIG. 5). Some sensor information (physical quantity) should be converted into other information (physical quantity) suitable for a classification process. Moreover, if sensor information contains noise components, then the noise components should be removed for an increase in the accuracy of a classification process. Therefore, it is preferable that predetermined collected information is converted into other information and converted values are used as feature quantities.

FIG. 5 is a diagram illustrating an example of the feature quantity data table 176. Specifically, the feature vector generating section 172 computes other information (physical quantity) based on predetermined collected information (physical quantity) of the multidimensional collected data table 117a (see FIG. 3), and stores the computed information (physical quantity) as feature quantities in the HDD 156. The feature vector generating section 172 generates the feature quantity data table 176 by storing the feature quantities in association with times when the collected information used to compute the feature quantities is acquired on the hydraulic excavator 101A.

For example, the feature vector generating section 172 computes a cylinder output force (cylinder thrust) Fb of the boom cylinder 11a at time 12:25:32 on the basis of the bottom pressure Pb of the boom cylinder 11a and the rod pressure Pr of the boom cylinder 11a that are acquired at the same time 12:25:32. The cylinder output force Fb is computed by subtracting the value computed by multiplying the rod pressure Pr of the boom cylinder 11a by the pressure bearing area of the rod side of the piston from the value computed by multiplying the bottom pressure Pb of the boom cylinder 11a by the pressure bearing area of the bottom side of the piston. The feature vector generating section 172 preferably performs a filtering process for removing noise components from the cylinder output force Fb.

Furthermore, the feature vector generating section 172 performs a frequency analysis on a time-sequence waveform of the cylinder output force Fb and stores a dominant frequency f at the time as a feature quantity in the HDD 156. A boom angle α and an outside temperature To are stored as they are as feature quantities in the HDD 156. Namely, the feature vector generating section 172 generates a feature quantity data table 176 by storing predetermined collected information (e.g., the boom angle α and the outside temperature To) of the multidimensional collected data table 117 as they are as feature quantities in the HDD 156, and converting a plurality of pieces of predetermined collected information (e.g., the bottom pressure Pb and the rod pressure Pr) of the multidimensional collected data table 117 into other information (physical quantity), and storing the converted values as feature quantities in the HDD 156.

If the magnitudes of respective feature quantities suffer deviations, then a classification process (step S125) to be described later may not appropriately be performed. A deviation includes a situation where, for example, a feature quantity A varies in the range from 0 to 1 while a feature quantity B varies in the range from 0 to 100. In the presence of such a deviation, the feature quantity B is larger in weight than the feature quantity A. As a result, in the classification process (step S125) to be described later, the feature quantity B tends to have a large effect whereas the feature quantity A tends to have a small effect. Consequently, it is preferable for the feature vector generating section 172 to perform a scale conversion process for uniformizing the weights of the respective feature quantities. The scale conversion process is, for example, a process for normalizing the collected information of the multidimensional collected data table 117 with its minimum and maximum values. For increasing the accuracy of the classification process (step S125) to be described later, the weights of the feature quantities may be adjusted as required.

The feature vector generating section 172 has completed the process of generating the feature quantity data table 176 (step S115), and then control goes to step S120. In step S120, the feature vector generating section 172 performs a process of segmenting feature vectors V from the feature quantity data table 176 (see FIG. 5) generated in step S115. A feature vector V includes multidimensional feature quantities (Fb, f, a, To) segmented at a predetermined time in the feature quantity data table 176, as indicated by the broken lie t2a in FIG. 5. The feature vector generating section 172 segments the multidimensional feature quantities into feature vectors (Fb, f, α, To) at respective times. Each of the feature vectors (Fb, f, α, To) represents a positional coordinate in a feature quantity space where the number of elements (four in the example illustrated in FIG. 5) indicates dimensionality. The positional coordinate will also be referred to as "feature quantity position".

In this manner, the feature vector generating section 172 computes, in a time division manner, feature vectors V where the information of the hydraulic excavator 101A that varies in a time sequence represents feature quantities (steps S115 and S120). When the feature vector generating section 172 has completed the process of segmenting feature vectors V (step S120), control goes to step S125.

In step S125, the classifying section 173 executes a classifying process for classifying the feature vectors V computed in the time division manner into a plurality of clusters. The classifying process for classifying the feature vectors V is a process of classifying a set of feature vectors V whose feature quantity positions are close to each other as a group (cluster). Close feature quantity positions mean that the elements (feature quantities) of the feature vectors V are similar to each other, indicating that the hydraulic excavator 101A is in a similar state. Although there exist various methods for classification, a k-means method that is one of clustering methods is used in the present embodiment. The k-means method is a method of classifying multidimensional data without teaching where input data are regarded as points in a multidimensional space and a cluster (batch) of data is found on the basis of the Euclidean distances between the points.

The classifying section 173 performs a clustering process according to the k-means method on the feature vectors V segmented at the times in step S120. First, the classifying section 173 assigns all feature quantity positions randomly to predetermined k clusters and compute center-of-gravity coordinate values with respect to the feature quantity positions assigned to the respective clusters.

Then, the classifying section 173 computes distances between the computed center-of-gravity coordinate values and all the feature quantity positions, and assigns the feature quantity positions to those clusters that are the same as the center-of-gravity coordinate values where the distances are closest. The classifying section 173 computes center-of-gravity coordinate values with respect to the feature quantity positions assigned to the respective clusters. The classifying section 173 repeatedly assigns clusters and computes center-of-gravity coordinate values until the center-of-gravity coordinate values remain unchanged. When the center-of-gravity coordinate values remain unchanged, the classifying section 173 determines that the classifying process has been completed, and ends the clustering process, after which control goes to step S130.

In step S130, the identification ID allocating section 174 generates identification IDs (i=1, 2, 3, • • •, k) for identifying the center-of-gravity coordinate values of the respective clusters, and allocates the identification IDs to the center-of-gravity coordinate values of the respective clusters. The identification ID allocating section 174 generates a classification model 175 by storing the center-of-gravity coordinate values and the identification IDs for identifying the center-of-gravity coordinate values in association with each other in the HDD 156.

FIG. 6 is a diagram illustrating an example of the classification model 175 generated by the classification model generating section 170. The classification model 175 is made up of identification IDs and center-of-gravity coordinate values (i.e., representative values of respective feature quantities) stored in association with the identification IDs. The center-of-gravity coordinate values are represented by representative feature vectors Vi (i=1, 2, 3, • • • , k). For example, the center-of-gravity coordinate value of an identification ID "1" is represented by a representative feature vector V1 (3.0, 20.2, 45, 20.5). When an identification ID allocating process (step S130) is completed, the process indicated by the flowchart of FIG. 4 is ended.

The process of generating the ID pattern model 184 by the management server 150 will be described in detail with reference to FIGS. 2, and 6 through 11. The management server 150 is able to execute an ID pattern model generating process for generating the ID pattern model 184 by computing, in a time division manner, feature vectors V where the information of the hydraulic excavator 101A that varies in a time sequence represents feature quantities, allocating identification IDs to the feature vectors V computed in the time division manner on the basis of the classification model 175, and storing patterns of identification IDs that vary in a time sequence according to a predetermined action of the hydraulic excavator 101A in association with identification information of the predetermined action.

As illustrated in FIG. 2, the data acquiring section 171 acquires a multidimensional collected data table 117 from the hydraulic excavator 101A and stores the acquired multidimensional collected data table 117 as a multidimensional collected data table 117b for learning in the HDD 156. Furthermore, the data acquiring section 171 acquires an action data table 118 from the hydraulic excavator 101A and stores the acquired action data table 118 in the HDD 116. The feature vector generating section 172 generates the feature quantity data table 176 (see FIG. 5) based on the multidimensional collected data table 117b for learning. The identification ID string generating section 181 generates an identification ID table 185 (see FIG. 8) as a data table of an identification ID string of identification IDS arrayed in a time sequence on the basis of the feature quantity data table 176 and the classification model 175. The ID pattern extracting section 182 extracts an identification ID string as an identification ID pattern in the zone (an action start time and an action end time) of a predetermined action from the identification ID table 185, on the basis of the action data table 118, and allocates an action name as identification information for identifying the action. The ID pattern extracting section 182 generates an ID pattern model 184 by storing the extracted identification ID pattern and the action names in association with each other. That is, the feature vector generating section 172, the identification ID string generating section 181, and the pattern extracting section 182 thus function as an ID pattern model generating section 180 for generating an ID pattern model 184 on the basis of the multidimensional collected data table 117b, the classification model 175, and the action data table 118.

Figure 7:
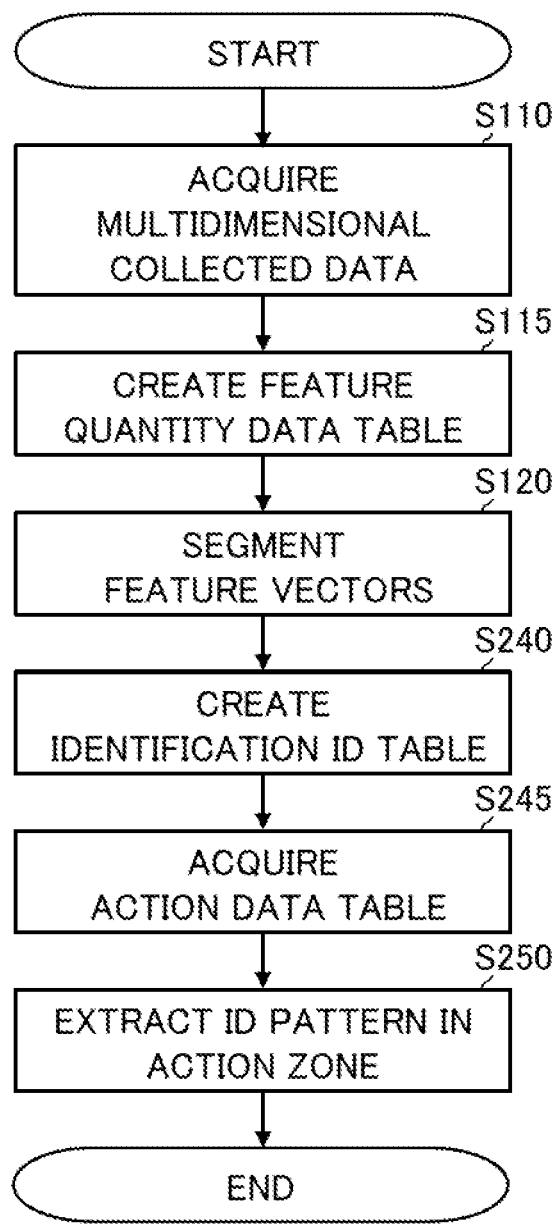
FIG. 7 is a flowchart of an ID pattern model generating process carried out by the management server.

FIG. 7 a is a flowchart of an ID pattern model generating process executed by the management server 150. The flowchart illustrated in FIG. 7 is started when an instruction for generating an ID pattern model 184 is input into the management server 150 using the input device 161 of the management apparatus 105, for example.

The processing of steps S110 through S120 illustrated in FIG. 7 is the same as the processing of steps S110 through S120 illustrated in FIG. 4, and will be omitted from description. Although a multidimensional collected data table 117 acquired as a multidimensional collected data table 117b for learning in step S110 may be the same data as the multidimensional collected data table 117 acquired as the multidimensional collected data table 117a for learning acquired in step S110 illustrated in FIG. 2, it may be different data. For example, a multidimensional collected data table 117 collected by causing the hydraulic excavator 101A to make a test action at a test site may be used for generating the classification model 175, and a multidimensional collected data table 117 collected by causing the hydraulic excavator 101A to make an action actually at a work site may be used for generating the ID pattern model 184. As illustrated in FIG. 7, when the process of segmenting feature vectors V (step S120) is completed, control goes to step S240.

In step S240, the identification ID string generating section 181 refers to the classification model 175 (see FIG. 6), extracts representative feature vectors Vi (i=1 to k) that are most similar to the feature vectors V segmented in step S120, and stores the identification IDs of the extracted representative feature vectors Vi in association with the times of the feature vectors V. Specifically, the identification ID string generating section 181 computes distances in the feature quantity space between feature quantity positions (see FIG. 5) represented by the feature vectors V at predetermined times ti segmented in step S120 and all center-of-gravity coordinate values (see FIG. 6) represented by representative feature vectors Vi of the classification model 175, and stores the identification IDs of the center-of-gravity coordinate values at the closest distances in association with the predetermined times ti. In step S240, the identification ID string generating section 181 establishes identification IDs for all the times in the feature quantity data table 176 (see FIG. 5), thereby generating an identification ID table 185 (see FIG. 8) of an identification ID string arrayed in a time sequence, after which control goes to step S245. In this manner, the identification ID string generating section 181 generates an identification ID table 185 by allocating identification IDs to the feature vectors V computed in a time division manner on the basis of the classification model 175.

FIG. 8 is a diagram illustrating an example of the identification ID table 185. As illustrated in FIG. 8, the identification ID table 185 is a data table of identification IDs associated with times. Although not shown, the identification ID table 185 is stored in the HDD 156.

As illustrated in FIG. 7, when the process of generating the identification ID table 185 (step S240) is completed, control goes to step S245. In step S245, the data acquiring section 171 acquires an action data table 118 (see FIG. 9) from the hydraulic excavator 101A via the communication link 109, and stores the acquired action data table 118 in the HDD 156. Then, control goes to step S250.

FIG. 9 is a diagram illustrating an example of the action data table 118. As illustrated in FIG. 9, the action data table 118 is a data table of action names, start times of the actions, and end times of the actions in association with each other.

The action data table 118, as well as the multidimensional collected data table 117 (117b), is generated by the machine controller 110 of the hydraulic excavator 101A. The operator of the hydraulic excavator 101A performs a predetermined operation (action name inputting operation) on the input device 120, thereby inputting a "action name (e.g., action A)" to the machine controller 110. Then, the operator of the hydraulic excavator 101A, when an action corresponding to the "action name (e.g., action A)" is to be started, performs a predetermined operation (start time inputting operation) on the input device 120. The machine controller 110 now stores the time at which the start time inputting operation is performed as a "start time" in association with the "action name (e.g., action A)" in the HDD 116. The operator of the hydraulic excavator 101A, when the action corresponding to the "action name (e.g., action A)" is to be ended, performs a predetermined operation (end time inputting operation) on the input device 120. The machine controller 110 now stores the time at which the end time inputting operation is performed as an "end time" in association with the "action name (e.g., action A) in the HDD 116.

The action name inputting operation includes an operation for selecting one of a plurality of action names displayed on a touch panel (the input device 120) or an operation for operating a keyboard (the input device 120) to input a character string, for example. The start time inputting operation and the end time inputting operation include a touching operation on the touch panel (the input device 120) or a pressing operation on a switch (the input device 120), for example. When the operator of the hydraulic excavator 101A thus performs a predetermined operation, the machine controller 110 generates an action data table 118 by storing the "action name," "start time," and "end time" in association with each other.

An action data table 118 may not be generated together with a multidimensional collected data table 117, but may be generated while a multidimensional collected data table 117 is being observed after the generation of the multidimensional collected data table 117 has been completed. An action name includes a natural-language-like name allocated to a series of state changes in the hydraulic excavator 101A. For example, an "excavating and loading action" is input as an action name corresponding to an action that involves excavating soil and loading a dump truck with the dug soil. Moreover, the "excavating and loading action" may be separated into an "excavating action" and a "loading action" as action names corresponding to respective actions.

As illustrated in FIG. 7, when an action data table acquiring process (step S245) is completed, control goes to step S250. In step S250, the ID pattern extracting section 182 refers to the action data table (see FIG. 9) and performs an ID pattern extracting process for extracting an identification ID string of a plurality of identification IDs in a zone where a predetermined action is performed, as an identification ID pattern, from the identification ID string (see FIG. 8) of all identification IDS arrayed in a time sequence.

FIG. 10 is a diagram explanatory of the ID pattern extracting process. As illustrated in FIG. 10, in the ID pattern extracting process (step S250 illustrated in FIG. 7), the ID pattern extracting section 182 refers to the action data table 118 (see FIG. 9) and extracts in a time sequence a plurality of identification IDs from a "start time" to an "end time" per "action name" from the action data table 118. If a plurality of identical identification IDs are extracted, then the ID pattern extracting section 182 leaves only one of the identification IDs. This is because duplicate identification IDs are ignored in a DP matching method to be described later.

For example, the ID pattern extracting section 182 refers to the action data table 118 and extracts in a time sequence a plurality of identification IDs included in the action zone (from start time 12:25:33 to end time 12:25:39) of the action A. If there are a plurality of identical successive identification IDs, the ID pattern extracting section 182 extracts only one of them. Therefore, the ID pattern extracting section 182 extracts "203", "70", "203" as an identification ID pattern in the action zone of the action A. The ID pattern extracting section 182 stores the identification ID patterns extracted in a time sequence in association with the action name "action A."

The ID pattern extracting section 182 generates an ID pattern model 184 by storing identification ID patterns in association with all "action names (action A, action B, action C, • • •)" stored in the action data table 118 in the HDD 156. When the ID pattern extracting process (step S250) is completed, the processing according to the flowchart illustrated in FIG. 7 is ended. In this manner, the ID pattern extracting section 182 generates an ID pattern model 184 by storing patterns of identification IDs that vary in a time sequence according to a predetermined action of the hydraulic excavator 101A in association with the action name (identification information) of the predetermined action. In the following description, an identification ID pattern stored (registered) in association with an action name will also be referred to as a registered ID pattern. FIG. 10 illustrates an example in which the registered ID pattern of each action includes three elements (e.g., the registered ID pattern of the action A includes three elements "203", "70", and "203"). However, a registered ID pattern may include two elements or four or more elements according to an action that the registered ID pattern represents.

Figure 11:
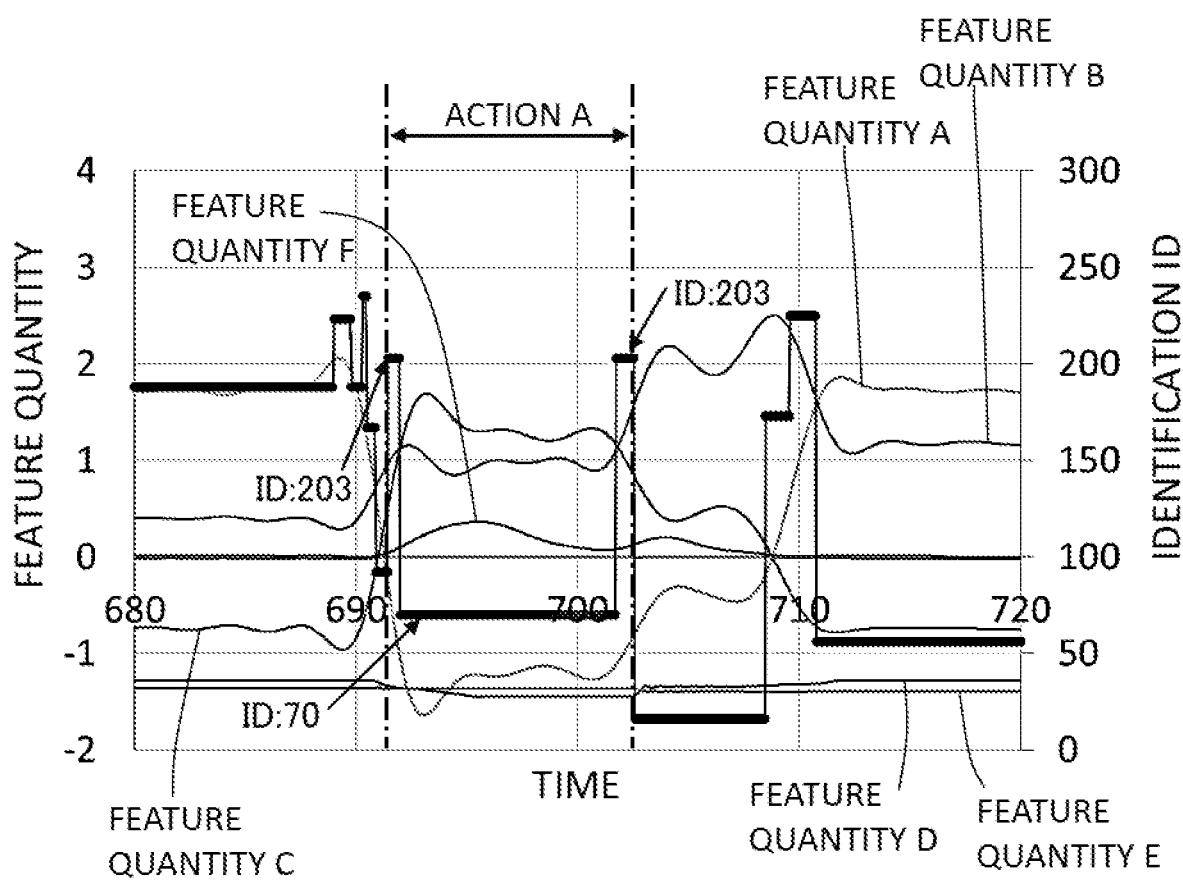
FIG. 11 is a graph illustrating time-dependent changes in feature quantities and identification IDs.

FIG. 11 is a graph illustrating time-dependent changes in feature quantities and identification IDs. As illustrated in FIG. 11, identification IDs change as the values of feature quantities A through F vary with time. Changing identification IDs represent changing states of the hydraulic excavator 101A. In the zone where the hydraulic excavator 101A is performing the action A, identification IDs change like "203"→"70"→"203".

An information outputting process by the management server 150 will be described in detail with reference to FIGS. 2, and 12 through 15. The management server 150 is able to execute an information outputting process for computing, in a time division manner, feature vectors V where the information of the hydraulic excavator 101A that varies in a time sequence represents feature quantities, allocating identification IDs to the feature vectors V computed in the time division manner on the basis of the classification model 175, generating output information for recognizing a predetermined action on the basis of changes in the identification IDs in a time sequence and the ID pattern model 184, and controlling the display device 165 as the output device to output the generated output information.

As illustrated in FIG. 2, the data acquiring section 171 acquires a multidimensional collected data table 117 from the hydraulic excavator 101A, and stores the acquired multidimensional collected data table 117 as a multidimensional collected data table 117c for recognizing actions of the hydraulic excavator 101A in the HDD 156. The feature vector generating section 172 generates a feature quantity data table 176 (see FIG. 5) based on the multidimensional collected data table 117c for recognizing actions. The identification ID string generating section 181 generates an identification ID table 185 (see FIG. 14) as a data table of an identification ID string of identification IDS arrayed in a time sequence on the basis of the feature quantity data table 176 and the classification model 175. The degree-of-similarity computing section 191 computes a degree of similarity between the identification ID string of the identification ID table 185 and the registered ID pattern of the ID pattern model 184. The display controlling section 192 generates information (data) of a display image representing the degree of similarity computed by the degree-of-similarity computing section 191 and outputs the generated information (data) to the display device 165. The display device 165 displays the display image representing the degree of similarity on the display screen 165a thereof on the basis of the information (data) of the display image input thereto. In other words, the display controlling section 192 controls the display device (output device) 165 to output the output information (the information of an image representing the degree of similarity of an action in the present embodiment,) for recognizing a predetermined action of the hydraulic excavator 101A. The feature vector generating section 172, the identification ID string generating section 181, the degree-of-similarity computing section 191, and the display controlling section 192 thus function as an output controlling section 190 for generating output information for recognizing actions of the hydraulic excavator 101A on the basis of the multidimensional collected data table 117c, the classification model 175, and the ID pattern model 184 and controlling the output device to output the generated output information.

Figure 12:
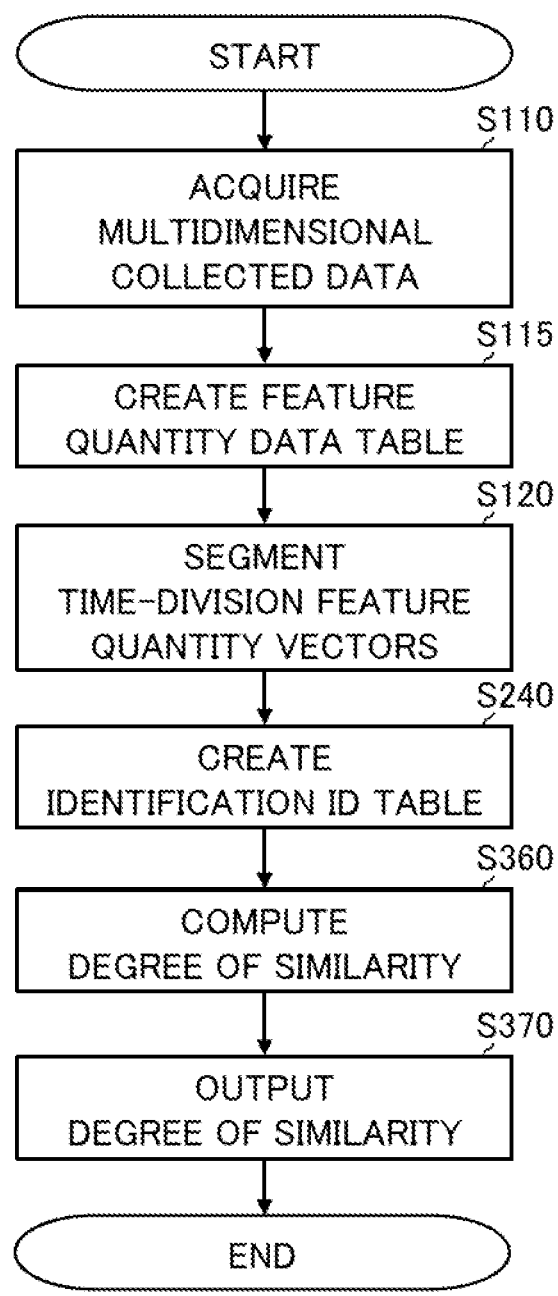
FIG. 12 is a flowchart of an information outputting process carried out by the management server.

FIG. 12 is a flowchart of an information outputting process executed by the management server 150. The flowchart illustrated in FIG. 12 is started when an instruction for executing an information outputting process is input into the management server 150 using the input device 161 of the management apparatus 105, for example.

As illustrated in FIG. 12, in step S110, the data acquiring section 171 acquires a multidimensional collected data table 117 from the hydraulic excavator 101A through the communication link 109, and stores the acquired multidimensional collected data table 117 as a multidimensional collected data table 117c for recognizing actions in the HDD 156. Then, control goes to step S115.

The multidimensional collected data table 117 acquired as the multidimensional collected data table 117c for recognizing actions in step S110 is different from the multidimensional collected data table 117 acquired as the multidimensional collected data tables 117a and 117b for learning in step S110 illustrated in FIG. 2 and step S110 illustrated in FIG. 7. The multidimensional collected data table 117 acquired as the multidimensional collected data table 117c for recognizing actions is generated to recognize actions of the hydraulic excavator 101A that has actually performed various pieces of work at a work site. In other words, the multidimensional collected data table 117c for recognizing actions is a data table generated from information collected while a work is being performed at a work site.

Since the processing of steps S115 and S120 is the same as the processing of steps S115 through S120 illustrated in FIG. 4, and the processing of step S240 illustrated in FIG. 12 is the same as the processing of step S240 illustrated in FIG. 7, they will be omitted from description. As illustrated in FIG. 12, when the process of generating the identification ID table 185 (step S240) is completed, control goes to step S360.

In step S360, the degree-of-similarity computing section 191 computes a cost representing the degree of similarity between the identification ID string of the identification ID table 185 and the registered ID pattern of the ID pattern model 184 with respect to each of the "action names" registered in the ID pattern model 184.

In the present embodiment, the degree-of-similarity computing section 191 computes a cost by performing DP matching on the registered ID pattern of the ID pattern model 184 and the identification ID string of the identification ID table 185. DP matching is a kind of elastic matching method for matching patterns by nonlinearly expanding and contracting them in view of expansions and contractions of the patterns on a time axis. Since DP matching is of general method, its detailed algorithm will not be described here. On human-operated machines like the hydraulic excavator 101A, some of patterns may be expanded and contracted on a time axis. DP matching is, as it is a kind of elastic matching method, preferable because the degree of similarity can be assessed even in a case where some of patterns are expanded and contracted on a time axis.

FIG. 13 is a diagram explanatory of features of DP matching. A case where an identification ID pattern with identification IDs varying in a sequence of "5"→"7"→"10" is registered in the ID pattern model 184 as illustrated in FIG. 13 at (a) will be described below. According to DP matching, as illustrated in FIG. 13 (b), an identification ID string in which successively duplicate identification IDs exist (e.g., an identification ID string in which identification IDs "5" and "7" are successively duplicated) and an identification ID string that is free of duplicate identification IDs are handled in the same manner.

The degree of similarity is represented by a moving cost (cost) from a start point to an end point of a pattern. FIG. 13(c) through FIG. 13 (e) illustrate examples of cost computation. In the example illustrated in FIG. 13(c), since an identification ID string has identification IDs varying in a sequence of "5"→"7"→"10" and is in full agreement with the registered ID pattern illustrated in FIG. 13(a), the cost is of a minimum value C0 (=0.0). In the example illustrated in FIG. 13(d), an identification ID string includes an identification ID "8" that is not included in the registered ID pattern illustrated in FIG. 13(a). Therefore, the computed cost is of a value C1 higher than the minimum value C0 (C1>C0). In the example illustrated in FIG. 13(e), an identification ID string includes an identification ID "9" instead of the identification ID "7" of the registered ID pattern of "5"→"7"→"10" illustrated in FIG. 13(a). Consequently, the computed cost is of a value C2 higher than the minimum value C0 and C1 (C2>C1>C0).

In this manner, the lower the value of the cost is, the higher the degree of similarity is, and the higher the value of the cost is, the lower the degree of similarity is. The minimum value of the cost is 0 (zero). The cost 0 means that the identification ID string and the identification ID pattern registered in the ID pattern model 184 (registered ID pattern) agree with each other.

Methods of calculating costs may include, for example, a cost calculating method (hereinafter referred to as a calculating method A) that compares an identification ID string and a registered ID pattern with each other or a cost calculating method (hereinafter referred to as a calculating method B) based on the distance between the feature quantity positions of identification IDs.

According to the calculating method A, an identification ID string and a registered ID pattern are compared with each other. If they agree with each other, the cost is set to 0 (zero), and if they do not agree with each other, the cost is set to a value higher than 0 (zero) according to a predetermined conditional formula. Inasmuch as accumulated costs at start and end points are different from each other depending on the number of elements of the registered ID pattern, the costs may be normalized with the number of elements.

According to the calculating method A, the distance between identification IDs in a feature quantity space is not taken into account. Therefore, in the example illustrated in FIG. 13(e), the cost remains the same regardless whether the Euclidean distance in a feature quantity space between the identification ID "9" of the identification ID string and the identification ID "7" of the registered ID pattern is close or distant.

In contrast, according to the calculating method B, the cost is computed on the basis of the distance between a feature quantity position corresponding to an identification ID of the identification ID table 185 and a feature quantity position corresponding to an identification ID of the registered ID pattern. As indicated by the broken-line arrow in FIG. 2, when computing the degree of similarity in accordance with the calculating method B, the degree-of-similarity computing section 191 acquires a feature quantity position corresponding to an identification ID of the registered ID pattern from the classification model 175. In a feature quantity space, the closer the distance is, the lower the cost is, and the more distant the distance is, the higher the cost is. For separating close feature quantities, a cost expression using a function that emphasizes a close distance, such as a logarithmic value of the Euclidean distance, may be employed.

Figure 14:
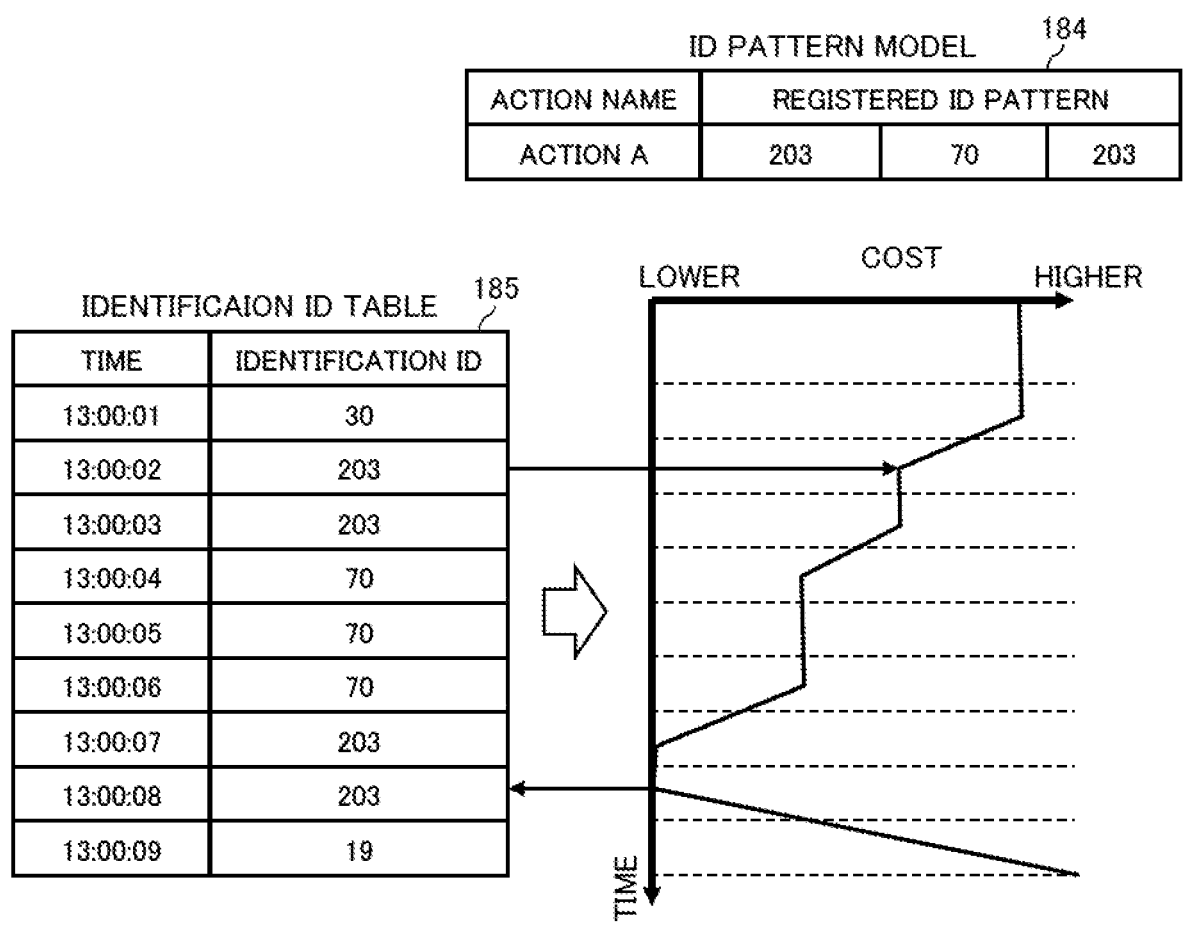
FIG. 14 is a diagram illustrating the degree of similarity (cost) between a registered ID pattern ("203"→"70"→"203") corresponding to an action A and an identification ID string of an identification ID table.

FIG. 14 is a diagram illustrating the degree of similarity (cost) between a registered ID pattern ("203"→"70"→"203") corresponding to an action A and an identification ID string of the identification ID table 185. As illustrated in FIG. 14, since the cost is computed in a time sequence, the cost is high until the identification ID "203" of the registered ID pattern appears in the identification ID string. The cost is reduced when the first identification ID "203" of the registered ID pattern appears at time "13:00:02" in the identification ID string, is further reduced when the identification ID "70" of the registered ID pattern appears at time "13:00:04", and reaches a minimum value when the last identification ID "203" of the registered ID pattern appears at time "13:00:07." Thereafter, the cost goes higher when an identification ID "16" not included in the registered ID pattern appears at time "13:00:09." Therefore, it can be determined whether the registered ID pattern is included in the identification ID string or not by detecting a zone (time) in which the cost is reduced.

In this manner, the degree-of-similarity computing section 191 computes the degree of similarity between identification IDs that change in a time sequence and the pattern (registered ID pattern) of identification IDs of the ID pattern model 184. As illustrated in FIG. 12, in step S360, the degree-of-similarity computing section 191 performs a process of computing the degree of similarity (cost) in a time sequence for each of the actions (the action A, the action B, the action C, • • • ). When the process of computing the degree of similarity (cost) for all the actions is completed, control goes to step S370.

In step S370, the display controlling section 192 generates, as output information, information (data) representing the degree of similarity (cost) computed in a time sequence in step S360, and controls the display device 165 to output the output information (i.e., controls the display device 165 to display a display image representing the degree of similarity), after which the processing represented by the flowchart illustrated in FIG. 12 is ended.

Figure 15:
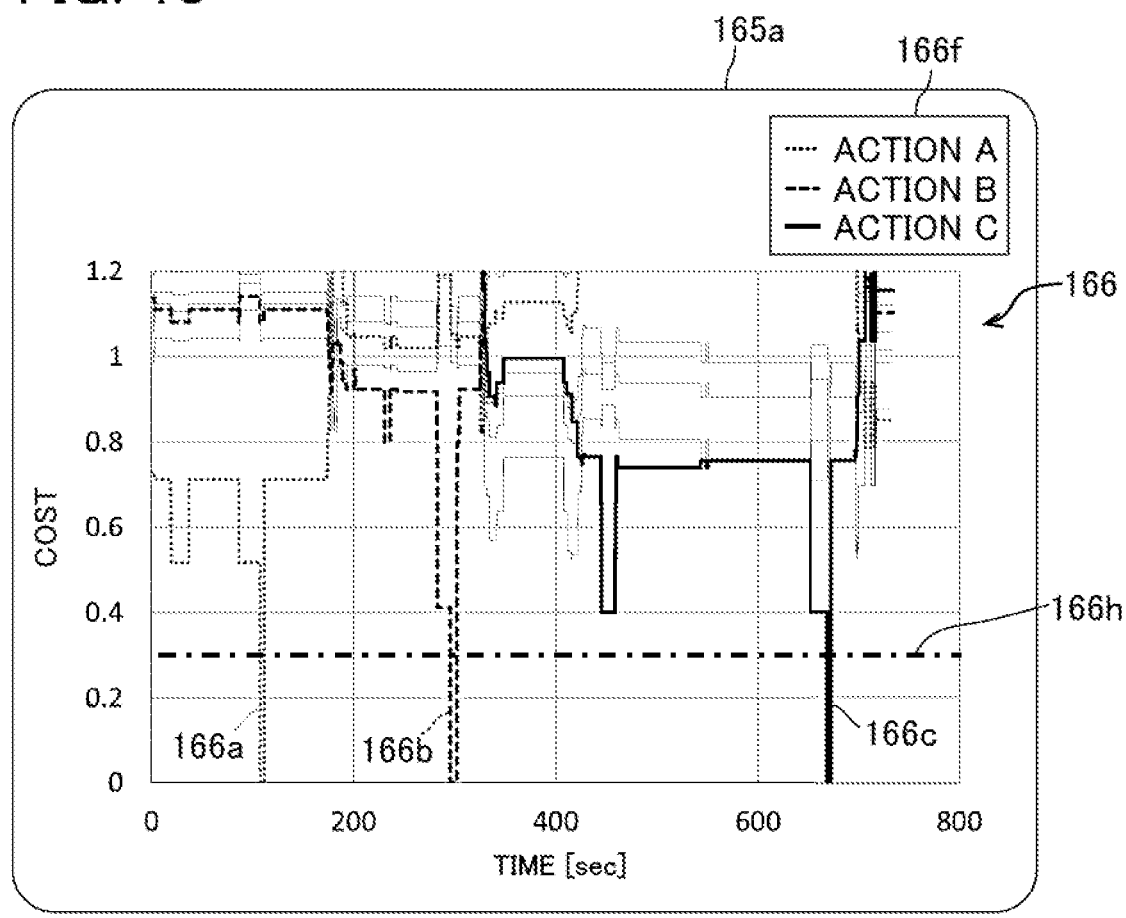
FIG. 15 is a diagram illustrating an example of a degree-of-similarity image displayed on the display screen of a display device.

FIG. 15 is a diagram illustrating an example of a degree-of-similarity image 166 displayed on the display screen 165a of the display device 165. The degree-of-similarity image 166 is an image that represents a graph whose vertical axis indicates cost and horizontal axis indicates time, and shows time-depending changes in cost with respect to a plurality of actions. The dotted-line curve represents a time-sequence degree of similarity 166a of an action name "action A," the broken-line curve represents a time-sequence degree of similarity 166b of an action name "action B," and the thick-solid-line curve represents a time-sequence degree of similarity 166c of an action name "action C." An explanatory image 166f showing the action names that are represented by the different curves is also displayed on the display screen 165a. Furthermore, an image 166h representing a cost reference line (threshold value Ct) as a mark indicative of whether a predetermined action has been performed or not is also displayed on the display screen 165a.

According to the present embodiment, as described above, since the degree of similarity with respect to each action that varies with time is displayed on the display screen of the display device 165, it can easily be recognized what action has been made at what timing (time) by the hydraulic excavator 101A, so that efforts can be made to increase the efficiency with which the hydraulic excavator 101A performs work.

In step S110 illustrated in FIG. 12, the description has been made that the multidimensional collected data table 117 is acquired from the hydraulic excavator 101A by way of example. However, data that are collected from time to time may be sequentially acquired, and degrees of similarity may be acquired and output.

The embodiment described above offers the following advantages:

(1) The action recognition system (management apparatus 105) 10 includes the display device (output device) 165 that outputs information, and the management server (controller) 150 that acquires information of the hydraulic excavator (machine) 101A with respect to running that varies in a time sequence, generates output information for recognizing an action of the hydraulic excavator 101A on the basis of the information of the hydraulic excavator 101A, and controls the display device 165 to output the output information. The management server 150 is able to execute the classification model generating process (see FIG. 4) for generating the classification model 175 by computing, in a time division manner, a plurality of feature vectors V where the information of the hydraulic excavator 101A that varies in a time sequence represents feature quantities, classifying the feature vectors V computed in the time division manner into a plurality of clusters, and allocating identification IDs to the clusters. The management server 150 is able to execute the ID pattern model generating process (see FIG. 7) for generating the ID pattern model 184 by computing, in a time division manner, feature vectors V where the information of the hydraulic excavator 101A that varies in a time sequence represents feature quantities, allocating identification IDs to the feature vectors V computed in the time division manner on the basis of the classification model 175, and storing patterns of identification IDs that vary in a time sequence according to a predetermined action (an excavating action, a loading action) of the hydraulic excavator 101A in association with identification information of the predetermined action. The management server 150 is able to execute the information outputting process (see FIG. 12) for computing, in a time division manner, feature vectors V where the information of the hydraulic excavator 101A that varies in a time sequence represents feature quantities, allocating identification IDs to the feature vectors V computed in the time division manner on the basis of the classification model 175, generating output information for recognizing a predetermined action on the basis of changes in the identification IDs in a time sequence and the ID pattern model 184, and controlling the display device 165 to output the output information.

With this configuration, as the classification model 175 and the ID pattern model 184 has been generated in advance, when the hydraulic excavator 101A performs a work at a work site, output information (information representing a degree of similarity) for recognizing a predetermined action is displayed on the display device 165. Therefore, the viewer of the display device 165 such as the operator of the hydraulic excavator 101A or the supervisor of the work site can easily recognize an action of the hydraulic excavator 101A from the output information (information representing a degree of similarity) displayed on the display screen 165a of the display device 165, making it possible to increase the efficiency with which the hydraulic excavator 101A performs work.

With the above configuration, furthermore, identification IDs are automatically allocated to a plurality of minute actions (partial actions) that make up a predetermined action (an excavating action, a loading action). Consequently, it is not necessary to establish identification information (action names) for the respective partial actions. If partial action names are to be established in a natural language for the respective partial actions, then as the number of partial actions increases, it is tedious and time-consuming to generate a table where the identification information (action names) for the respective partial actions and information of the hydraulic excavator 101A are associated with each other, tending to result in an increase in the cost incurred to manufacture the action recognition system. According to the present embodiment, since identification IDs are automatically allocated to partial actions as described above, the cost of manufacturing the action recognition system 10 can be reduced.

(2) According to the present embodiment, an identification ID is allocated to each sampling period for feature quantities. Therefore, the time resolution of an identification ID string is identical to the sampling period for feature quantities. Consequently, a higher time resolution can be obtained than if collected information is segmented in a predetermined time duration longer than the sampling period and a partial action is extracted.

(3) The management server 150 uses, as feature quantities, physical quantities (e.g., the cylinder output force Fb) computed from a plurality of different kinds of physical quantities (e.g., the bottom pressure Pb and the rod pressure Pr of the boom cylinder 11a) sensed by the sensors of the hydraulic excavator 101A. The number of feature quantities can be reduced when a plurality of pieces of information (physical quantities) are converted into another one piece of information (physical quantity).

Second Embodiment

An action recognition system according to a second embodiment of the present invention will be described below with reference to FIGS. 16 and 17. Those parts in FIGS. 16 and 17 that are identical or correspond to those according to the first embodiment are denoted by identical reference numerals and the differences will mainly be described below. The action recognition system according to the second embodiment measures the number of predetermined actions on the basis of a degree of similarity (cost) and displays an accumulative number of times on the display screen 165a of the display device 165. The action recognition system according to the second embodiment will be described in detail below.

Figure 16:
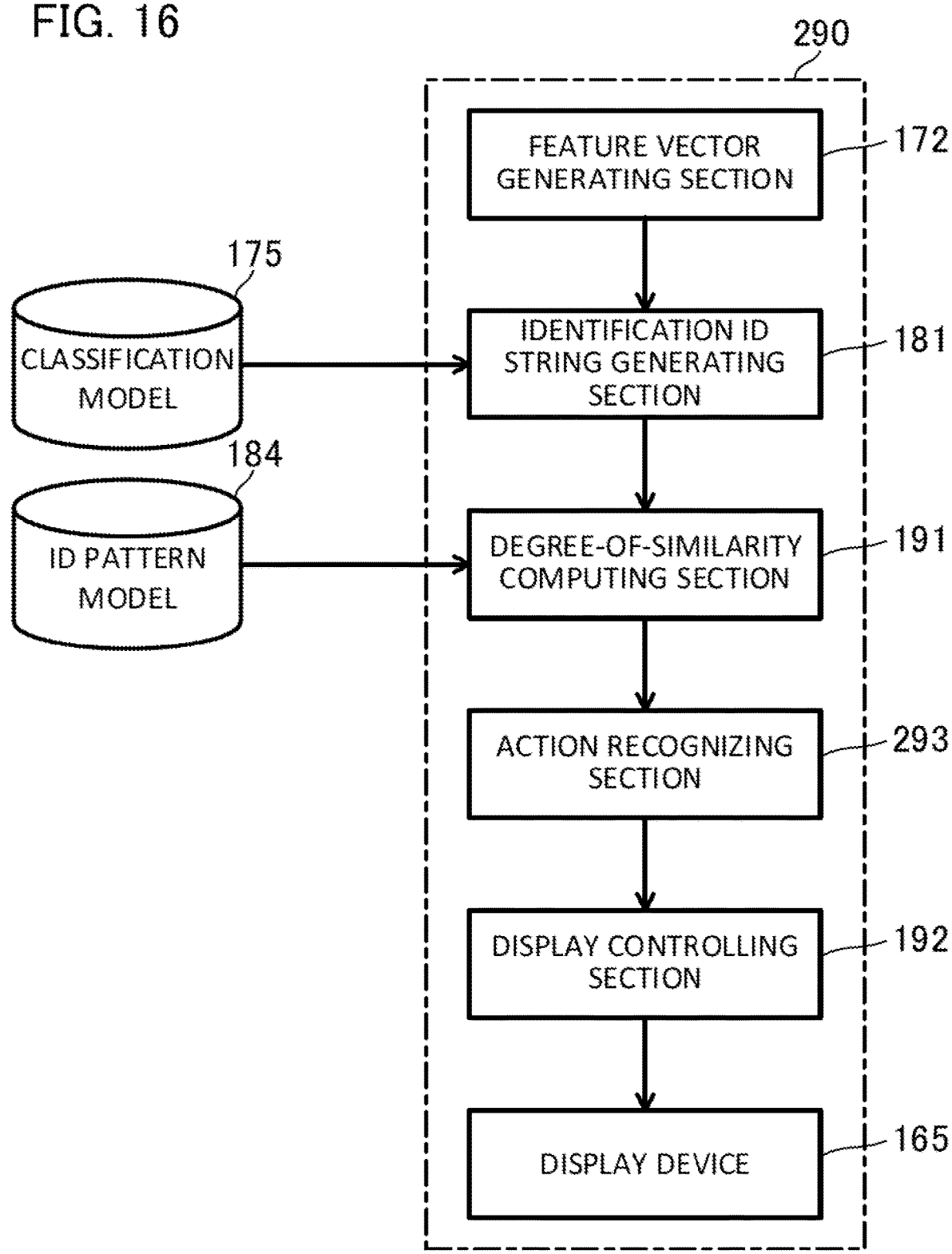
FIG. 16 is a diagram of an output controlling section of an action recognition system according to a second embodiment of the present invention and data used by the output controlling section.

FIG. 16 is a diagram of an output controlling section 290 of the action recognition system according to the second embodiment of the present invention and data used by the output controlling section 290. As illustrated in FIG. 16, the output controlling section 290 has an action recognizing section 293. The action recognizing section 293 determines whether an action under an action name registered in the ID pattern model 184 has been performed or not on the basis of the cost computed by the degree-of-similarity computing section 191. If a state where a cost C is higher than a predetermined threshold value Ct changes to a state where the cost C is equal to or lower than the threshold value Ct, then the action recognizing section 293 determines that an action has been performed. The threshold value Ct is stored in advance in the ROM 152.

If a state where a cost C of an action A is higher than a predetermined threshold value Ct changes to a state where the cost C is equal to or lower than the threshold value Ct, for example, then the action recognizing section 293 determines that the action A has been performed, and measures the number of times that the action A has been performed. The action recognizing section 293 measures the number of times that it has determined that a predetermined action has been performed as an occurrence count, and stores an accumulated value thereof (accumulated occurrence count) in the HDD 156. The action recognizing section 293 generates an accumulated occurrence count table by storing times at which the action has occurred and the accumulated occurrence count of the action in association with each other in the HDD 156. The accumulated occurrence count table is a data table representing the relation between accumulated occurrence counts of actions and uptimes of the hydraulic excavator 101A.

The display controlling section 192 generates, as output information, display image representing the accumulated occurrence counts of actions on the basis of the accumulated occurrence count table and controls the display device 165 to output the generated output information.

Figure 17:
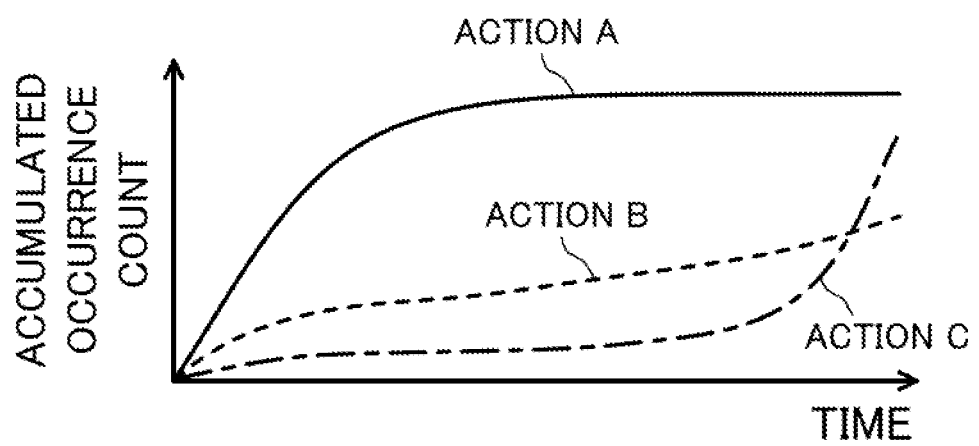
FIG. 17 is a diagram illustrating an example of an image that represents accumulated occurrence counts of actions displayed on the display screen of a display device.

FIG. 17 is a diagram illustrating an example of an image that represents accumulated occurrence counts of actions displayed on the display screen 165*a* of the display device 165. The horizontal axis indicates uptimes of the hydraulic excavator 101A and the vertical axis indicates the accumulated occurrence counts of actions. In FIG. 17, the solid-line curve represents time-dependent changes in the accumulated occurrence count of an "action A," the broken-line curve represents time-dependent changes in the accumulated occurrence count of an "action B," and the dot-and-dash-line curve represents time-dependent changes in the accumulated occurrence count of an "action C." According to the present embodiment, the display device 165 thus can display the accumulated occurrence counts of actions of the hydraulic excavator 101A. Therefore, the service staff can easily guess a deterioration of components involved in actions with high accumulated occurrence counts and hence can appropriately establish a timing for replacing the components, a timing for adjusting the components, etc. In addition, the operator can confirm whether there are wasteful actions or not, a lack of predetermined actions, or the like from the information of the accumulated occurrence counts, and hence can increase the efficiency with which the hydraulic excavator 101A performs work by adjusting the number of times of actions to be made in subsequent work.

According to the second embodiment, as described above, the management server 150 computes the number of times a predetermined action is performed on the basis of changes in identification IDs in a time sequence and the ID pattern model 184, generates output information (information of a display image representing time-dependent changes in the accumulated occurrence count of the action) based on the computed number of times, and controls the output device (display device 165) to output the output information in the information outputting process. According to the second embodiment, therefore, in addition to the advantages offered by the first embodiment, the efficiency of maintenance work and the efficiency with which the hydraulic excavator 101A performs work can be increased by analyzing the information of the accumulated occurrence counts of actions displayed on the display device 165.

The management server 150 may display, instead of a display image of accumulated occurrence counts, a display image about degrees of accumulated fatigue damage or a consumed amount of service life on the display screen 165*a* of the display device 165.

<Modification 1 of Second Embodiment>

According to the second embodiment described above, the description has been made that the action recognizing section 293 computes the accumulated occurrence count of an action and the display controlling section 192 generates a display image representing the computed accumulated occurrence count. However, the present invention is not limited to such a feature. The action recognizing section 293 may compute an occurrence frequency on a time axis of a predetermined action on the basis of changes in identification IDs in a time sequence and the ID pattern model 184, and the display controlling section 192 may generate output information based on the computed occurrence frequency and control the display device 165 to output the generated output information.

The action recognizing section 293 measures the number of times that it has determined that a predetermined action has been made as the occurrence count of the action, and computes an occurrence count per predetermined time duration as an occurrence frequency. The action recognizing section 293 generates an occurrence frequency table by dividing the time axis into a predetermined time duration and storing the occurrence count of an action in the predetermined time duration as an occurrence frequency in the HDD 156. The occurrence frequency table is a data table representing the relation between the occurrence frequencies of actions and uptimes of the hydraulic excavator 101A.

The display controlling section 192 generates a display image representing the occurrence frequencies of actions as output information and controls the display device 165 to output the generated output information.

Figure 18:
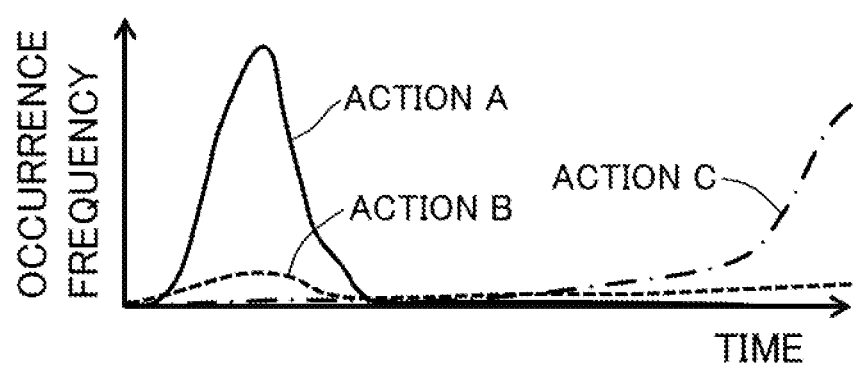
FIG. 18 is a diagram illustrating an example of an image that represents an occurrence frequency of actions displayed on the display screen of the display device.

FIG. 18 is a diagram illustrating an example of an image that represents the occurrence frequencies of actions displayed on the display screen 165*a* of the display device 165. The horizontal axis indicates uptimes of the hydraulic excavator 101A and the vertical axis indicates the occurrence frequencies of actions. In FIG. 18, the solid-line curve represents time-dependent changes in the occurrence frequency of an "action A," the broken-line curve represents time-dependent changes in the occurrence frequency of an "action B," and the dot-and-dash-line curve represents time-dependent changes in the occurrence frequency of an "action C." According to the present modification, the display device 165 thus can display the occurrence frequencies on a time axis of predetermined actions of the hydraulic excavator 101A. Therefore, the supervisor of work performed by the hydraulic excavator 101A can confirm what action has been made at what time by the hydraulic excavator 101A and hence can increase the efficiency with which the hydraulic excavator 101A performs work by adjusting a subsequent work plan. In addition, the operator can confirm whether there are wasteful actions or not, a lack of certain actions, or the like from the information of the occurrence frequencies, and hence can increase the efficiency with which the hydraulic excavator 101A performs work by adjusting the number of times of actions to be made in subsequent work.

<Modification 2 of Second Embodiment>

The action recognizing section 293 may compute the occurrence frequency of a predetermined action in a predetermined area on the basis of changes in the identification IDs in a time sequence and the ID pattern model 184, and the display controlling section 192 may generate output information based on the computed occurrence frequency, and control the display device 165 to output the generated output information.

The hydraulic excavator 101A has an plurality of GNSS (Global Navigation Satellite System) antennas (hereinafter referred to as GNSS antennas) and a position computing apparatus for computing the position of the hydraulic excavator 101A in a geographic coordinate system (global coordinate system) on the basis of satellite signals (GNSS radio waves) received from a plurality of positioning satellites by the GNSS antennas.

The action recognizing section 293, when determining that a predetermined action has been performed, stores the position of the hydraulic excavator 101A computed by the position computing apparatus as a location where the action has occurred in the HDD 156. The action recognizing section 293 divides the map of work sites in the geographic coordinate system into a mesh of areas, generating a plurality of divided areas. The action recognizing section 293 then generates an occurrence frequency map by storing the divided areas and the occurrence frequencies of actions in the divided areas in association with each other in the HDD 156. The occurrence frequency map is a map representing the relation between locations where the actions have occurred (divided areas) and the occurrence frequencies of the actions.

According to the present modification, as described above, the display device 165 can display occurrence frequencies (occurrence distribution) in predetermined areas (in work sites) of predetermined actions of the hydraulic excavator 101A. Therefore, the supervisor of work performed by the hydraulic excavator 101A can confirm what action is being made at what place by the hydraulic excavator 101A, and hence can increase the efficiency with which the hydraulic excavator 101A performs work by adjusting a subsequent work plan.

<Modification 3 of Second Embodiment>

The action recognizing section 293 may compute the degree of a deterioration of a component (e.g., a seal member of a hydraulic cylinder used to perform an excavating action) used to make each action on the basis of the accumulated occurrence count of the action, and the display controlling section 192 may generate a display image representing the computed degree of a deterioration of the component and control the display device 165 to display an image representing the degree of a deterioration of the component on the display screen 165a. The action recognizing section 293 may compute the degree of a deterioration of a predetermined component on the basis of the accumulated occurrence count of a single action (e.g., an action A) or may compute the degree of a deterioration of a predetermined component on the basis of the accumulated occurrence counts of a plurality of kinds of action (e.g., an action A and an action B).

Third Embodiment

An action recognition system according to a third embodiment of the present invention will be described below with reference to FIGS. 19 and 20. Those parts in FIGS. 19 and 20 that are identical or correspond to those according to the first and second embodiments are denoted by identical reference numerals and the differences will mainly be described below. The action recognition system according to the third embodiment displays, along with the degree-of-similarity image 166, additional information added to an action name and an animation 367 of an action on the display screen 165a of the display device 165. The action recognition system according to the third embodiment will be described in detail below.

Figure 19:
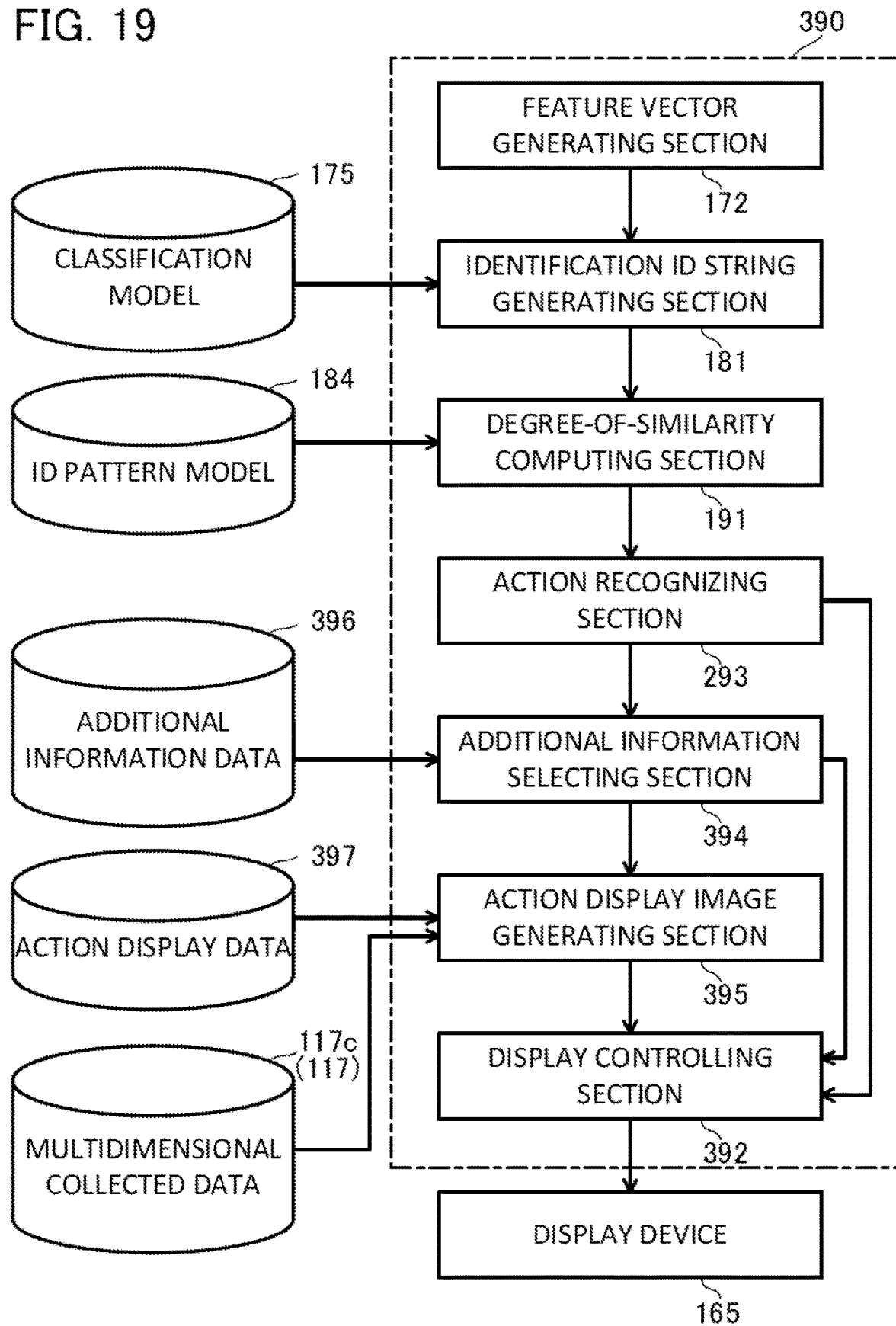
FIG. 19 is a diagram of an output controlling section of an action recognition system according to a third embodiment of the present invention and data used by the output controlling section.

FIG. 19 is a diagram of an output controlling section 390 of the action recognition system according to the third embodiment of the present invention and data used by the output controlling section 390. FIG. 20 is a diagram illustrating an example of an image displayed on the display screen 165a of the display device 165 of the action recognition system according to the third embodiment. As illustrated in FIG. 19, the output controlling section 390 has an additional information selecting section 394 and an action display image generating section 395. The HDD 156 of the management server 150 stores therein an additional information data table 396 and an action display database 397.

As is the case with the second embodiment, the action recognizing section 293 determines whether a predetermined action has been performed or not on the basis of a degree of similarity (cost). If the action recognizing section 293 determines that the predetermined action has been performed, then the action recognizing section 293 stores the time at which the predetermined action has been performed and the predetermined action in association with each other in the HDD 156.

If the action recognizing section 293 determines that the predetermined action has been performed, then the additional information selecting section 394 selects additional information corresponding to the predetermined action from the additional information data table 396. The additional information data table 396 is a data table where "action names" and "additional information" are stored in association with each other.

The action display image generating section 395 generates an action image for displaying a three-dimensional animation (moving image) on the display device 165. The action display database 397 includes member shape data including the information of shapes and colors for displaying the members (the track structure 2, the swing structure 3, the boom 11, the arm 12, and the bucket 13) of the hydraulic excavator 101A, data of joints (pivoting fulcrum), etc. of the member shape data. The member shape data, the data of joints, etc. may be registered as data of respective types of the hydraulic excavator 101A in the action display database 397. In this case, when the type of the hydraulic excavator 101A in use is input to the management server 150 using the input device 161, the action display image generating section 395 selects member shape data and data of joints corresponding to the inputted type and generates an action image.

According to the present embodiment, the hydraulic excavator 101A includes a posture computing apparatus for computing posture information including a boom angle $\alpha$, an arm angle $\beta$, a bucket angle $\gamma$, an angle $\theta$ of tilt of the track structure 2 in forward and rearward directions with respect to a reference plane (e.g., a horizontal plane), an angle $\phi$ of tilt of the track structure 2 in leftward and rightward directions with respect to the reference plane, a relative angle (turning angle) $\varphi$ between the track structure 2 and the swing structure 3, etc. on the basis of signals from posture sensors including the boom angle sensor 124, an arm angle sensor, a bucket angle sensor, a forward and rearward machine body angle-of-tilt sensor, a leftward and rightward machine body angle-of-tilt sensor, a turning angle sensor, etc.

According to the present embodiment, the multidimensional collected data table 117 contains the posture information ($\alpha$, $\beta$, $\gamma$, $\theta$, $\phi$, $\varphi$) computed by the posture computing apparatus. The action display image generating section 395 extracts the posture information ($\alpha$, $\beta$, $\gamma$, $\theta$, $\phi$, $\varphi$) contained in the multidimensional collected data table 117c as action data, and generates an action image of the hydraulic excavator 101A on the basis of the extracted action data and the member shape data and the data of joints from the action display database 397. More specifically, the action display image generating section 395 generates an action image using three-dimensional computer graphics (3DCG) of the hydraulic excavator 101A in each sampling period on the basis of the member shape data, the data of joints, and the posture information in each sampling period. 3DCG includes a process of geometrically expressing a machine body shape based on the shape data of the hydraulic excavator 101A and projecting the geometrically expressed machine body shape onto a projection plane in the direction in which the machine body shape is viewed, thereby obtaining a two-dimensional image. Therefore, the appearances of the hydraulic excavator 101A from various viewpoints can be visualized. In addition, various postures can also be expressed by the components (such as the boom and the arm) of the hydraulic excavator 101A being pivoted around their joints as pivoting fulcrums on the basis of the posture information (action data).

Figure 20:
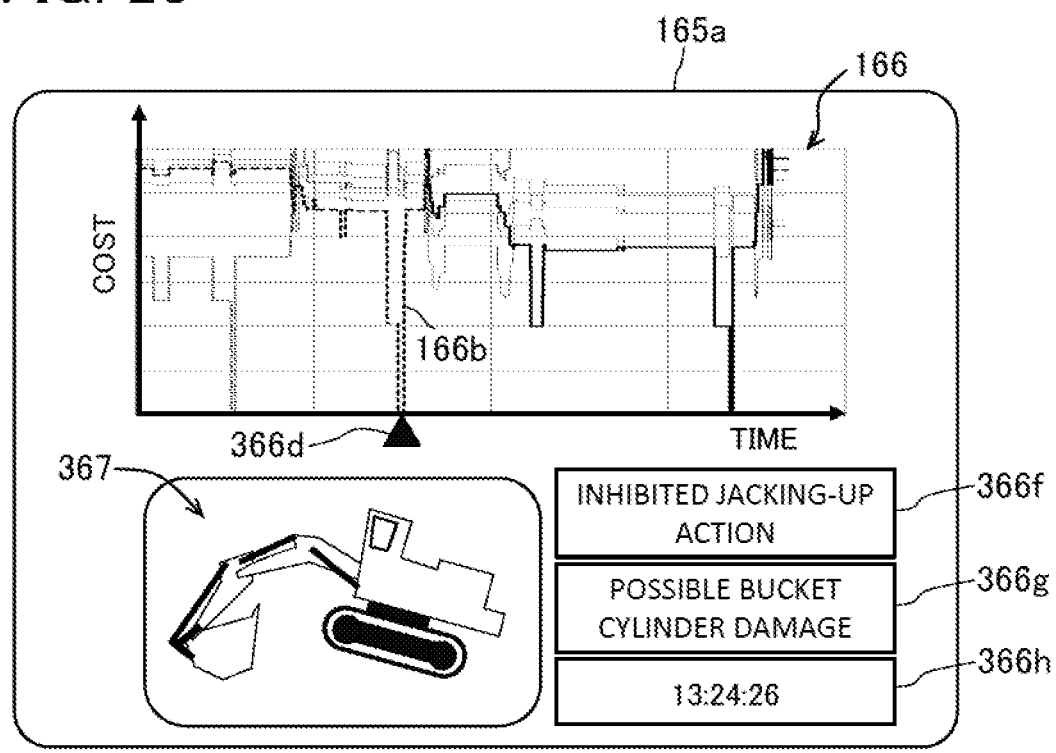
FIG. 20 is a diagram illustrating an example of an image displayed on the display screen of a display device of the action recognition system according to the third embodiment.

A display controlling section 392 controls the display device 165 to display the animation (moving image) 367 of the hydraulic excavator 101A on the display screen 165a, as illustrated in FIG. 20, by varying in a time sequence a plurality of action images generated by the action display image generating section 395. Moreover, the display controlling section 392 controls the display device 165 to display a time marker 366d indicating the time corresponding to an action image of the animation 367 at the horizontal axis (time axis) of the degree-of-similarity image 166 on the display screen 165a. Consequently, the time marker 366a moves to the right along the time axis as the animation 367 varies from image to image.

For displaying the animation 367 at the time where a predetermined action is made, the display controlling section 392 controls the display device 165 to display an image (action name image) 366f representing the action name of the predetermined action and an image (time image) 366h representing the time at which the predetermined action is made on the display screen 165a. Furthermore, the display controlling section 392 controls the display device 165 to display an image (additional information image) 366g representing additional information selected by the additional information selecting section 394 on the display screen 165a.

The example illustrated in FIG. 20 shows a screen image displayed when a jacking-up action is made as a predetermined action at time "13:24:26." The jacking-up action represents an action in which the work implement 4 acts to cause the bucket 13 to push the ground, raising the hydraulic excavator 101A due to reactive forces from the ground into a posture where a front portion of the track structure 2 is lifted off from the ground by a rear portion thereof as a fulcrum. In jacking-up operation, a large load is imposed on the bucket cylinder 13a. According to the illustrated example, therefore, a message image representing a precaution "POSSIBLE BUCKET CYLINDER DAMAGE" is displayed as the additional information image 366g on the display screen 165a. The display screen 165a also displays "INHIBITED JACKING-UP ACTION" representing an action name as the action name image 366f.

According to the third embodiment, as described above, the management server 150 generates an action image of the hydraulic excavator 101A on the basis of the information (posture information contained in the multidimensional collected data table 117c) of the hydraulic excavator 101A used to compute feature vectors V and the shape data (shape data of the track structure 2, the swing structure 3, the boom 11, the arm 12, and the bucket 13) of the hydraulic excavator 101A, and controls the display device 165 to display the animation 367 of the hydraulic excavator 101A on the basis of the action image on the display screen 165a in the information outputting process.

This allows the viewer of the display device 165 to be given information that is easily understandable visually as to what action has been made at what time. In particular, when actions of a work machine having a number of joints such as the hydraulic excavator 101A are to be recognized, there are cases in which viewing only a graph such as the degree-of-similarity image 166 takes time to recognize what actions have been performed. According to the present embodiment, the animation 167 of the hydraulic excavator 101A as well as the degree-of-similarity image 166 is displayed on the display screen 165a of the display device 165. Therefore, the viewer of the display device 165 can recognize the action performed by the hydraulic excavator 101A in a short period of time, thereby increasing the efficiency with which to adjust a work plan, etc.

Moreover, the management apparatus 105 includes the storage device (HDD 156) storing therein additional information corresponding to action names (identification information). The management server 150 generates output information (information about a message for paying attention such as "POSSIBLE BUCKET CYLINDER DAMAGE" on the basis of the action names (identification information) and the additional information, and controls the display device 165 to output the output information in the information outputting process. The viewer is thus given additional information about an action, indicating that an action done at a predetermined time is an action possibly causing damage to a predetermined component, thereby prompting the viewer to pay attention to reduce the number of times that the action is made.

<Modification 1 of Third Embodiment>

According to the third embodiment, the description has been made that the output controlling section 390 generates an animation based on the posture information contained in the multidimensional collected data table 117 by way of example. However, the present invention is not limited to such a feature. An output controlling section 390B may generate an animation based on changes in a time sequence of identification IDs.

Figure 21:
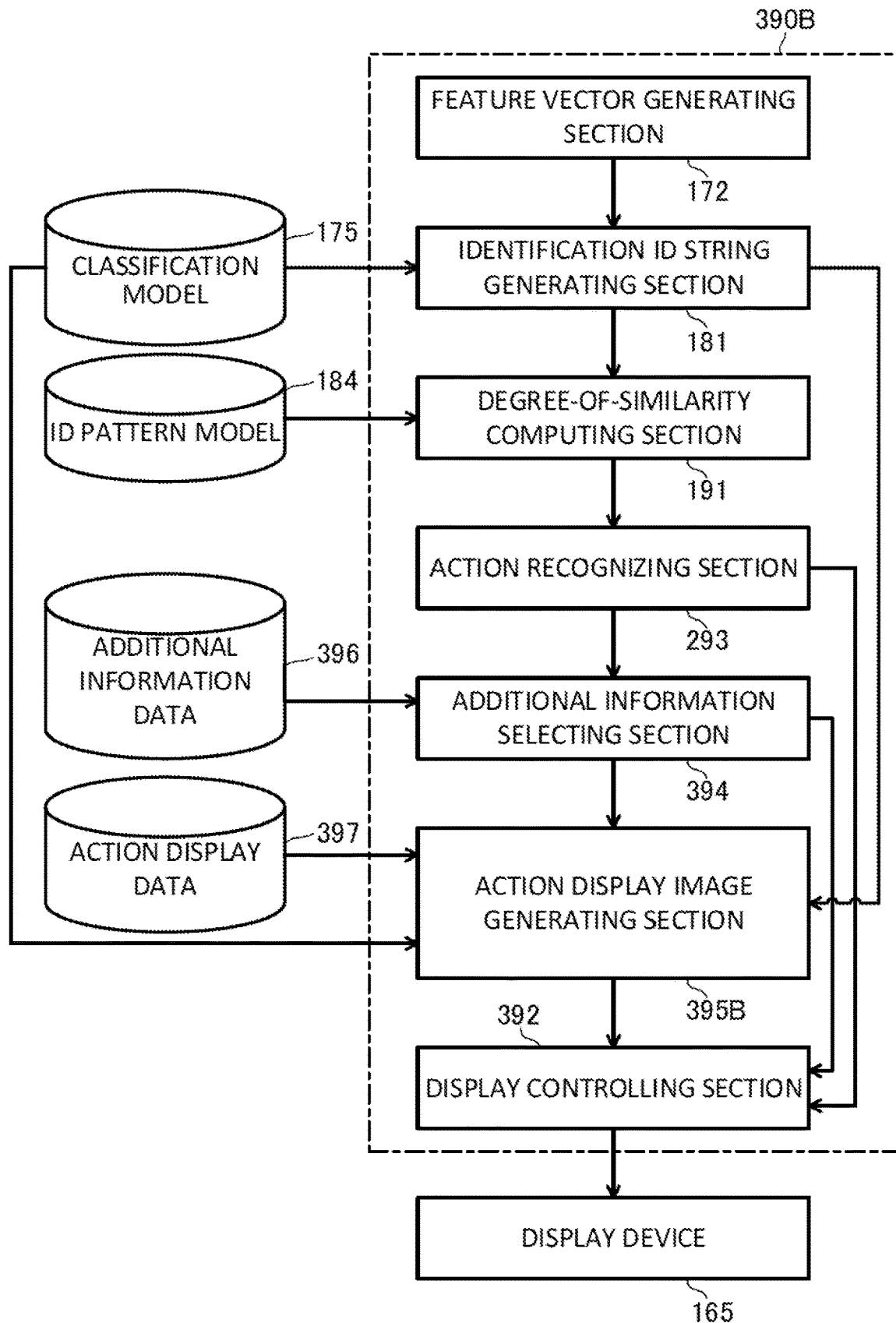
FIG. 21 is a diagram of an output controlling section of an action recognition system according to Modification 1 of the third embodiment and data used by the output controlling section.

FIG. 21 is a diagram of an output controlling section 390B of an action recognition system according to Modification 1 of the third embodiment of the present invention and data used by the output controlling section 390B. An action display image generating section 395B selects from the classification model 175 a representative feature vector Vi corresponding to identification IDs in a time sequence that make up the identification ID table 185 generated by the identification ID string generating section 181. The action display image generating section 395B extracts posture information ($\alpha$, $\beta$, $\gamma$, $\theta$, $\phi$, $\varphi$) included in the feature quantities of the selected representative feature vector Vi, generates an image of the hydraulic excavator 101A on the basis of the extracted feature quantities (posture information) and the member shape data and the data of joints from the action display database 397, and controls the display device 165 to display the generated image in a time sequence.

However, since the single representative feature vector Vi is selected from the identification IDs, the animation 367 is liable to be rougher in movement than when the animation 367 is generated on the basis of the posture information of the multidimensional collected data table 117 (third embodiment). When the animation 367 is generated using the multidimensional collected data table 117, the animation 367 is able to express a smooth movement as the time resolution is higher. On the other hand, if images corresponding to the posture information of the representative feature vector Vi corresponding to the identification IDs in a time sequence are successively displayed, they tend to express a jerky movement. According to the present modification, a key frame method used in the field of computer animation is employed.

The key frame method is a method of interpolating and generating a posture between postures as keys (also referred to as key frame interpolation). Using the key frame method, posture information (i.e., action data such as $\alpha$, $\beta$, $\gamma$, $\theta$, $\phi$, $\varphi$, etc.) between postures as keys is interpolated and generated to express a smooth animation. The action display image generating section 395B uses posture information (action data) of the representative feature vector Vi corresponding to the identification IDs as control points, and interpolates and generates posture information (action data) between the control points that is generated according to changes in a time sequence of the identification IDs, thereby generating an action image. The display controlling section 392 controls the display device 165 to display the animation 367 on the display screen 165a on the basis of the action image generated by the action display image generating section 395B.

Figure 22:
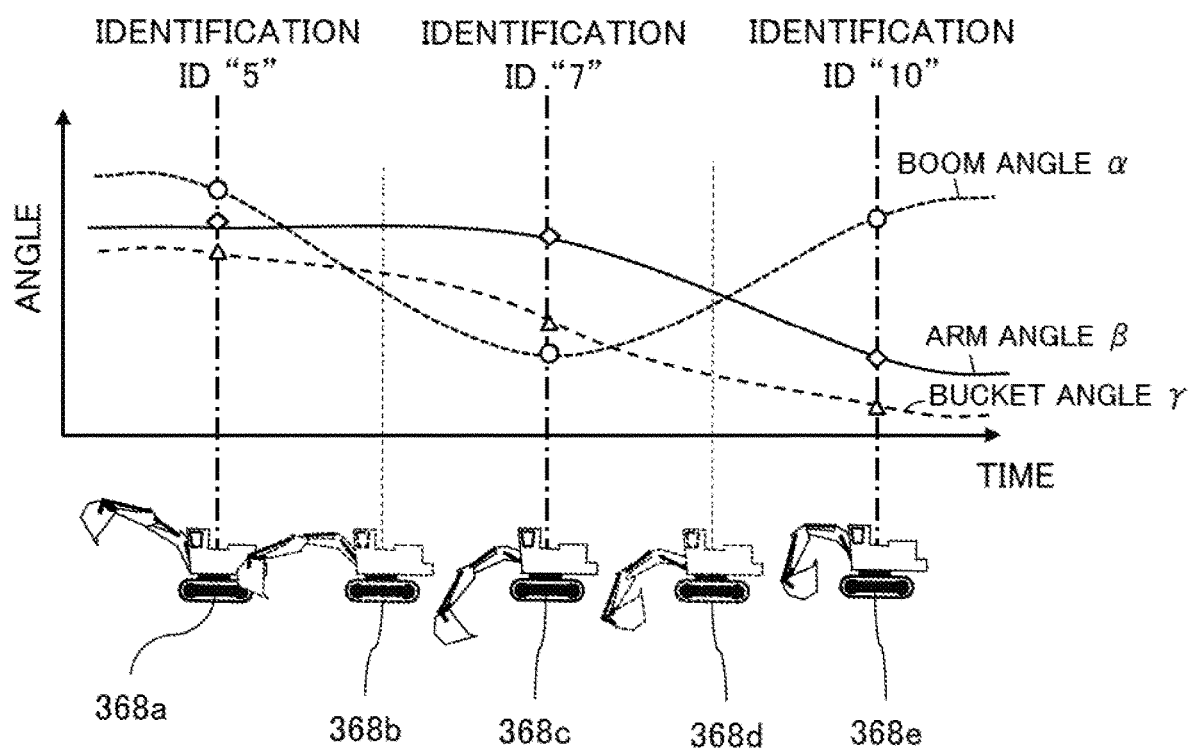
FIG. 22 is a diagram explanatory of action data that are interpolated when identifications ID change in the sequence of "5"→"7"→"10."

An example in which action data are interpolated and generated using the key frame method will be described below with reference to FIG. 22. FIG. 22 is a diagram explanatory of action data that are interpolated and generated when identifications ID change in the sequence of "5"→"7"→"10." For the sake of brevity, the angles θ and φ of tilt and the turning angle φ will be described as a predetermined angle) (0° that does not vary with time.

When images representing a posture 368a corresponding to the identification ID "5," a posture 368c corresponding to the identification ID "7," and a posture 368e corresponding to the identification ID "10" are successively displayed on the display device 165, the images express a jerky movement. According to the present modification, as described above, an action image between key frames is generated using a key frame interpolation method where posture information of representative vectors Vi corresponding to the identification IDs "5," "7," and "10" represents key frames. The action display image generating section 395B interpolates action data (boom angle α, arm angle β, bucket angle γ) at times between key frames using an interpolating function such as a spline function where the feature quantities (boom angle α, arm angle β, bucket angle γ) linked to the identification IDs represent control points (action data as keys). Specifically, the action display image generating section 395B generates action data (α, β, γ) representing a posture 368b between the posture 368a at the identification ID "5" and the posture 368c at the identification ID "7" and action data (α, β, γ) representing a posture 368d between the posture 368c at the identification ID "7" and the posture 368e at the identification ID "10" on the basis of the three action data (α, β, γ) at the identification IDs "5," "7," "10."

The action display image generating section 395B generates an action image of the posture 368b on the basis of the action data (action data obtained by the interpolation) at the time between the identification ID "5" and the identification ID "7." Similarly, the action display image generating section 395B generates an action image of the posture 368d on the basis of the action data (action data obtained by the interpolation) at the time between the identification ID "7" and the identification ID "10." In FIG. 22, a single posture is illustrated between key frames. Actually, however, action data representing a plurality of postures are generated by an interpolation. An animation is generally made up of 30 images per second. If the identifications ID change in the sequence of "5"→"7"→"10" for a period of 10 seconds, then 300 (10 seconds×30 images/second) images are required. In other words, for generating an animation that is about 10 seconds long, the action display image generating section 395B generates about 300 data of each of the boom angle α, the arm angle β, and the bucket angle γ (action data) that vary in a time sequence. Then, the action display image generating section 395B generates action images at interpolated times according to 3DCG (i.e., by way of shape projection). In this manner, about 300 action images are generated. The display controlling section 392 controls the display device 165 to display the about 300 action images successively at a rate of about 30/second on the display screen 165a. This makes it possible to express a smooth movement on account of the animation. Although a method of interpolating and generating action data using a spline function as an interpolating function has been described above, the present invention is not limited to such a method, but action data may be generated by any of various interpolating methods.

According to the present modification, the management server 150 generates action data by interpolating image data between key frames that are generated according to the identification IDs change in a time sequence, the key frames representing feature quantities (posture information) of the representative feature vectors Vi corresponding to the identification IDs, and controls the display device 165 to display the animation 367 of the hydraulic excavator 101A on the basis of the action data in the information outputting process. According to the present modification, as with the third embodiment described above, since the animation 367 can express a smooth movement, the viewer of the display device 165 can easily recognize the action of the hydraulic excavator 101A.

When the animation 367 is generated according to the key frame method, it is general practice to generate key frames manually, and it is tedious and time-consuming to generate action data. According to the present modification, in contrast, action data are automatically generated on the basis of the representative feature vectors Vi that are generated by clustering. Therefore, the time and labor required to generate key frames manually are eliminated, and the action of the hydraulic excavator 101A can be displayed in an animation that is easy to understand visually.

The management server 150 may not generate action data interpolated between key frames according to the key frame method, but may control the display device 165 to display successively on the display screen 165a illustration images (e.g., still images of the posture 368a, the posture 368c, the posture 368e) generated on the basis of the representative feature vectors Vi corresponding to the identification IDs. Although those illustration images express a jerky movement, they allow the action to be recognized with more ease than if no illustration images are displayed on the display device 165. In addition, as the management server 150 may use a less expensive CPU 151 for successively displaying illustration images than if the animation 367 is generated according to the key frame method, the cost of the management server 150 may be reduced.

<Modification 2 of Third Embodiment>

Figure 23:
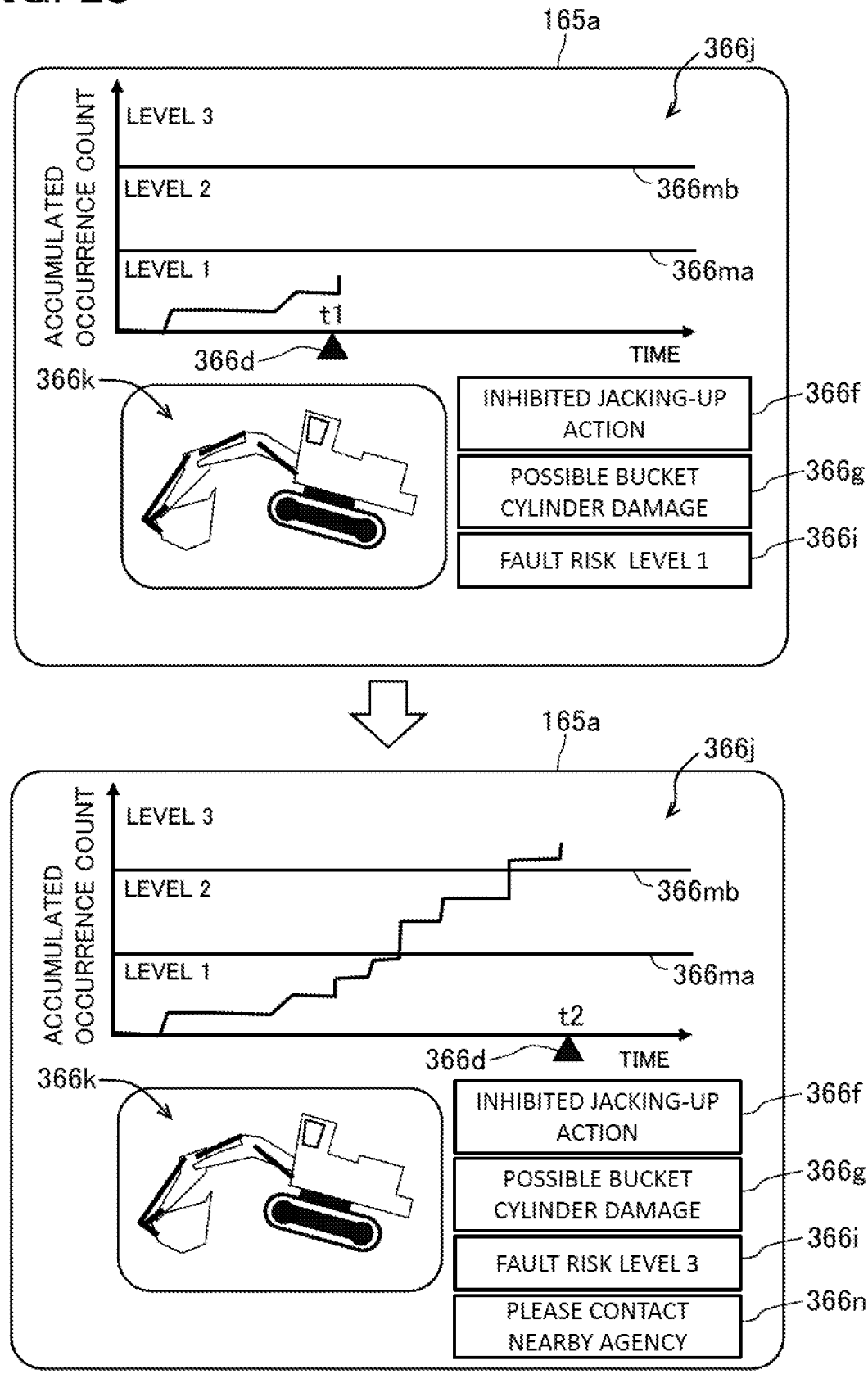
FIG. 23 is a diagram illustrating an example of images displayed on the display screen of a display device of an action recognition system according to Modification 2 of the third embodiment.

According to the third embodiment, the description has been made, by way of example, that the output controlling section 390 controls the display device 165 to display on the display screen 165a the degree-of-similarity image 166, the action name image 366f, the additional information image 366g, the time image 366h, and the animation 367. However, the present invention is not limited to such a feature. As illustrated in FIG. 23, the output controlling section 390 may control the display device 165 to display on the display screen 165a an image (accumulated occurrence count image) 366j representing time-dependent changes in the accumulated occurrence count of a predetermined action, an image (fault risk image) 366i representing a fault risk computed on the basis of the accumulated occurrence count, and a still image 366k representing a characteristic posture of the predetermined action.

As with the second embodiment, the action recognizing section 293 illustrated in FIG. 19 determines whether a predetermined action has been made or not on the basis of the degree of similarity (cost), and generates an accumulated occurrence count table based on the determined result. The larger the accumulated occurrence count of the predetermined action is, the higher the possibility of a fault of a predetermined component is. According to the present modification, the output controlling section 390 controls the display device 165 to display on the display screen 165*a* an image representing the degree of a possibility of a fault (level of a fault risk) according to the accumulated occurrence count of the predetermined action as a fault risk image 366*i* (see FIG. 23).

The action recognizing section 293 sets the level of a fault risk to 1 if the accumulated occurrence count is less than a first threshold value, sets the level of a fault risk to 2 if the accumulated occurrence count is equal to or more than the first threshold value and less than a second threshold value, and sets the level of a fault risk to 3 if the accumulated occurrence count is equal to or larger than a third threshold value. The display controlling section 392 controls the display device 165 to display on the display screen 165*a* an image representing the level of a fault risk set by the action recognizing section 293 as a fault risk image 366*i* (see FIG. 23). Moreover, the display controlling section 392 controls the display device 165 to display on the display screen 165*a* a still image 366*k* representing a characteristic posture of the predetermined action. The still image 366*k* is stored as additional information in association with the predetermined action. The still image 366*k* may be generated from the posture information included in the multidimensional collected data table 117 at the time the predetermined action is being performed or may be generated on the basis of identification IDs making up the registered ID pattern corresponding to the predetermined action.

According to the second embodiment, inasmuch as only the image representing time-dependent changes in the accumulated occurrence count is displayed on the display device 165, it is necessary for the viewer to judge the degree of a possibility of a fault of a predetermined component. According Modification 2 of the third embodiment, in contrast, the management server 150 computes the degree of a possibility of a fault (level of a fault risk) of a predetermined component and controls the display device 165 to display an image (fault risk image) 366*i* representing the degree of a possibility of a fault on the basis of the computed degree of a possibility. Therefore, the viewer can easily judge the degree of a possibility of a fault. Moreover, the viewer can recognize the occurrence frequency of the action that increases the possibility of a fault in correlation to time-dependent changes in the future, from the accumulated occurrence count image 366*j* representing time-dependent changes in the accumulated occurrence count.

The level of a fault risk may be set not only on the basis of the accumulated occurrence count of a single action, but also on the basis of the accumulated occurrence counts of a plurality of actions. In this case, a weight depending on the action or actions may be allocated to the level of a fault risk. Alternatively, the level of a fault risk may be set on the basis of the degree of an accumulated fatigue damage or a consumed amount of service life instead of the accumulated occurrence count. A fault risk may be set to at least two levels, e.g., levels 1 through 3 that are progressively higher in the order named.

FIG. 23 is a diagram illustrating an example of images displayed on the display screen 165*a* of the display device 165 of the action recognition system according to Modification 2 of the third embodiment of the present invention. In the example illustrated in FIG. 23, the accumulated occurrence count image 366*j* is displayed such that the accumulated occurrence count increases with time. The display screen 165*a* illustrated in an upper portion of FIG. 23 displays an accumulated occurrence count image 366*j* representing an accumulated value of action occurrence counts up to predetermined time t1. The accumulated occurrence count image 366*j* may be an image in which the accumulated occurrence count and the level of a failure risk corresponding to the count are associated with each other. In the illustrated example, the accumulated occurrence count image 366*j* includes a reference line 366*ma* representing the first threshold value and a reference line 366*mb* representing the second threshold value, the first and second threshold values being used in setting the level of a fault risk. The display screen 165*a* also displays a fault risk image 366*i* indicating that the level of a fault risk at time t1 is 1. As the accumulated occurrence count increases with time, the display screen 165*a* illustrated in a lower portion of FIG. 23 displays an accumulated occurrence count image 366*j* representing an accumulated value of action occurrence counts up to predetermined time t2. The display screen 165*a* also displays a fault risk image 366*i* indicating that the level of a fault risk at time t2 is 3. As illustrated, when the level of a fault risk is 3, the display screen 165*a* may display a message image 366*n* such as "PLEASE CONTACT NEARBY AGENCY" prompting the viewer to contact an agency or the like.

FIG. 23 illustrates the example in which the level of a fault risk is displayed. However, a message representing a change in a fault risk (e.g., "LEVEL OF FAULT RISK OF COMPONENT A HAS INCREASED FROM 1 TO 2") may be displayed on the display screen 165*a* of the display device 165. Notification modes are not limited to display, but may include mails sent to external terminals, for example. The viewer may thus be notified of an increase in the fault risk of a predetermined component and prompted to pay attention to reduce the number of times that the action is made. Furthermore, the background color of the fault risk image 366*i* may be made different depending on the level of a fault risk. For example, when the level of a fault risk is 1, the background color of the fault risk image 366*i* may be blue. When the level of a fault risk is 2, the background color of the fault risk image 366*i* may be yellow. When the level of a fault risk is 3, the background color of the fault risk image 366*i* may be red.

Moreover, an image that relates a part of the work machine 101 to the degree of accumulated damage (or a fault risk) of the part may be displayed on the display screen 165*a* of the display device 165. For example, a frame image surrounding a part with a graphic figure such as a circle may be displayed in the still image 366*k* for specifying the part. At this time, only a part having a high level (level 3) of a fault risk may be surrounded and highlighted by a red circle, or a combination of color codes representing respective levels may be displayed. Any color codes may be combined as desired. If there are so many parts to be displayed that no sufficient display area is available for the still image 366*k*, then the action name image 366*f*, the additional information image 366*g*, the fault risk image 366*i*, and the message image 366*n* may not be displayed, and the still image 366*k* may be displayed at an enlarged scale in an area that includes the areas where those images were displayed. The viewer is now able to recognize intuitively and visually which part is suffering a high degree of damage from the overall image (still image 366k) of the work machine 101.

Fourth Embodiment

An action recognition system according to a fourth embodiment of the present invention will be described below with reference to FIG. 24. Those parts in FIG. 24 that are identical or correspond to those according to the first and second embodiments are denoted by identical reference numerals and the differences will mainly be described below. The action recognition system according to the fourth embodiment measures the duration time of a predetermined action. The duration time represents a work time from the start of the predetermined action, e.g., "excavating action," "loading action," "excavating and loading action," or the like to the end of the predetermined action.

Figure 24:
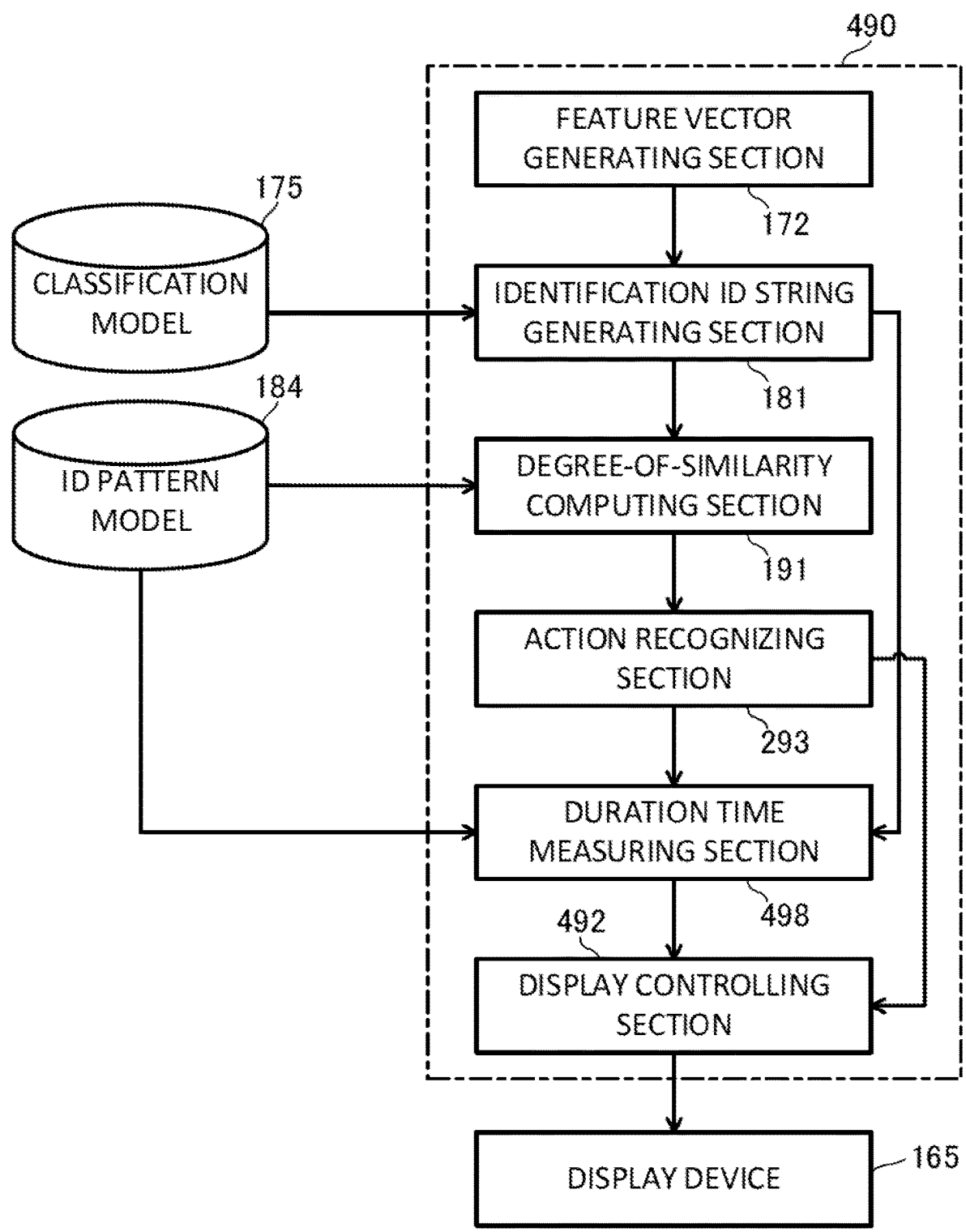
FIG. 24 is a diagram of an output controlling section of an action recognition system according to a fourth embodiment and data used by the output controlling section.

FIG. 24 is a diagram of an output controlling section 490 of the action recognition system according to the fourth embodiment and data used by the output controlling section 490. As illustrated in FIG. 24, the output controlling section 490 has a duration time measuring section 498. The duration time measuring section 498 searches the identification ID string of the identification ID table 185 generated by the identification ID string generating section 181 for a start point (a start time of a predetermined action) and an end point (an end time of the predetermined action) of the registered ID pattern, and computes a period of time from the start time to the end time of the predetermined action as a duration time of the predetermined action. In the same manner as described above, the action recognizing section 293 determines whether the predetermined action has been performed or not on the basis of the degree of similarity.

The duration time measuring section 498 refers to the identification ID table 185 and determines whether the identification ID of the time at which it is determined that the predetermined action has been performed is set continuously after the time or not. If the duration time measuring section 498 determines that the identification ID is set continuously, the duration time measuring section 498 sets the last time of the same identification ID that is continuously set as the end time of the predetermined action. If the duration time measuring section 498 determines that the identification ID is not set continuously, the duration time measuring section 498 sets the time at which it determines that the predetermined action has been performed as the end time of the predetermined action.

The duration time measuring section 498 refers to the identification ID table 185 and sets the time at which the first identification ID of the registered ID pattern corresponding to the predetermined action has appeared at a time prior to the time at which it is determined that the predetermined action has been performed as the start time of the predetermined action.

A specific example of a method of measuring the duration time will be described below with reference to FIG. 14. In the example illustrated in FIG. 14, the action recognizing section 293 determines that an action A is performed at time "13:00:07." The duration time measuring section 498 determines whether the identification ID 203 at time "13:00:07" is also set at time "13:00:08" or not. Since the identification ID 203 is also set at time "13:00:08," the duration time measuring section 498 sets the last time "13:00:08" of the same identification ID that is continuously set as the end time of the action A. The duration time measuring section 498 sets time "13:00:02" at which the first identification ID of the registered ID pattern "203"→"70"→"203" corresponding to the action A appears at a time prior to time "13:00:07" at which it is determined that the action A has been performed, as the start time of the action A. The duration time measuring section 498 computes a duration time of "6 sec." by subtracting the start time "13:00:02" from the end time "13:00:08" of the action A.

A display controlling section 492 illustrated in FIG. 24 controls the display device 165 to display on the display screen 165a a display image representing the average value, integrated value, etc. of duration times of respective actions in a predetermined period. The duration time of the action and the start and end times of the action may be transmitted to a device (e.g., a portable terminal carried by a maintenance worker) that has installed therein an application for analyzing actions of the hydraulic excavator 101A.

The management server 150 according to the present embodiment computes a duration time of a predetermined action on the basis of changes in a time sequence of the identification IDs and the ID pattern model 184, generates output information representing the duration time on the basis of the computed duration time, and controls the display device (output device) 165 to output the output information in the information outputting process. According to the present embodiment, the duration time, start time, and end time of an action of the hydraulic excavator 101A are measured and these items of information are displayed on the display device 165. Therefore, the viewer of the display device 165 can use the duration time, start time, and end time of the action that are displayed on the display device 165 for analyzing work of the hydraulic excavator 101A.

The modifications to be described below fall within the scope of the present invention. It is possible to combine the configurations according to the modifications and the configurations according to the above embodiments with each other, combine the configurations according to the above different embodiments with each other, and combine the configurations according to the different modifications to be described below with each other.

<Modification 1>

In the above embodiments, the description has been made, by way of example, that the management apparatus 105 functions as the action recognition system 10 for the hydraulic excavator 101A. However, the present invention is not limited to such a feature. The action recognition system 10 may be provided by only the hydraulic excavator 101A or the action recognition system 10B, 10C (see FIGS. 25 and 26) may be provided by the hydraulic excavator 101A and the management apparatus 105.

<Modification 1-1>

Figure 25:
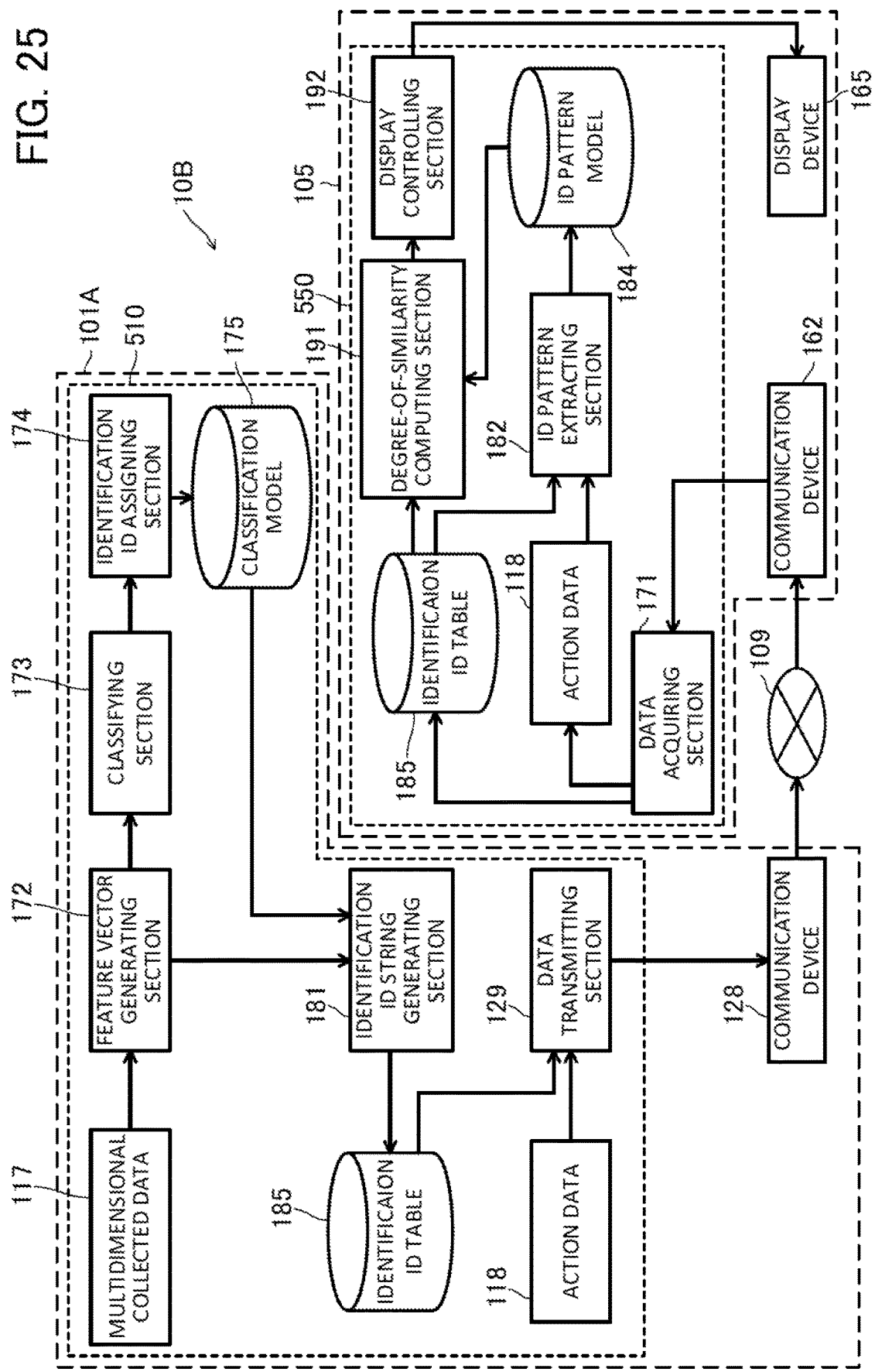
FIG. 25 is a functional block diagram of an action recognition system according to Modification 1-1.

FIG. 25, which is similar to FIG. 2, is a functional block diagram of an action recognition system 10B according to Modification 1-1. The present modification is different from the first embodiment in that a machine controller 510 of the hydraulic excavator 101A has a function to generate the classification model 175 and a function to generate the identification ID table 185, and a management server 550 does not have those functions.

As illustrated in FIG. 25, the machine controller 510 of the hydraulic excavator 101A functions as the feature vector generating section 172, the classifying section 173, the identification ID allocating section 174, the identification ID string generating section 181, and the data transmitting section 129 by executing the programs stored in the ROM 112. The identification ID string generating section 181 generates the identification ID table 185 based on the feature quantity data table 176 and the classification model 175 and stores the generated identification ID table 185 in the HDD 116. The data transmitting section 129 transmits the identification ID table 185 stored in the HDD 116 from the communication device 128 via the communication link 109 to the management apparatus 105.

The management server 550 of the management apparatus 105 functions as the data acquiring section 171, the ID pattern extracting section 182, the degree-of-similarity computing section 191, and the display controlling section 192 by executing the programs stored in the ROM 152.

The data acquiring section 171 acquires the identification ID table 185 and the action data table 118 from the hydraulic excavator 101A via the communication device 162 through the communication link 109 and stores the identification ID table 185 and the action data table 118 in the HDD 156. The ID pattern extracting section 182, the degree-of-similarity computing section 191, and the display controlling section 192 have the same functions as those according to the first embodiment and will be omitted from detailed description.

As described above, the action recognition system 10B according to the present modification has the machine controller (first controller) 510 that the hydraulic excavator 101A has and the management server (second controller) 550 that the management apparatus (external apparatus) 105 disposed outside of the hydraulic excavator 101A has. The machine controller 510 is able to execute a first information outputting process for computing, in a time division manner, feature vectors V where the information of the hydraulic excavator 101A that varies in a time sequence represents feature quantities, allocating identification IDs to the feature vectors V computed in the time division manner on the basis of the classification model 175, and transmitting the information of an identification ID string representing changes in the identification IDs in a time sequence to the management apparatus 105. The management server 550 is able to execute a second information outputting process for generating output information for recognizing a predetermined action on the basis of changes in the identification IDs in a time sequence and the ID pattern model 184, and controlling the display device (output device) 165 to output the output information.

According to the first embodiment, the multidimensional collected data table 117 made up of a plurality of kinds of collected information (physical quantities) acquired in each of sampling periods is transmitted from the hydraulic excavator 101A through the communication link 109 to the management apparatus 105. According to the present modification, in contrast, the machine controller 510 of the hydraulic excavator 101A generates the identification ID table 185 as a data table of changes in the identification IDs in a time sequence and transmits the generated identification ID table 185 through the communication link 109 to the management apparatus 105. The identification ID table 185 has a smaller amount of data than the multidimensional collected data table 117. According to the present modification, therefore, the volume of communication traffic can be smaller than according to the first embodiment.

For calculating a cost according to the cost calculating method (calculating method B) based on the distance between the feature quantity positions of identification IDs, the classification model 175 may be transmitted in advance from the machine controller 510 of the hydraulic excavator 101A through the communication link 109 to the management server 550 of the management apparatus 105 and stored in the HDD 156. The degree of similarity computed by the degree-of-similarity computing section 191 may be transmitted through the communication link 109 to a portable terminal carried by the maintenance worker, and the degree-of-similarity image 166 may be displayed on the display screen of the portable terminal by an application installed in the portable terminal.

<Modification 1-2>

Figure 26:
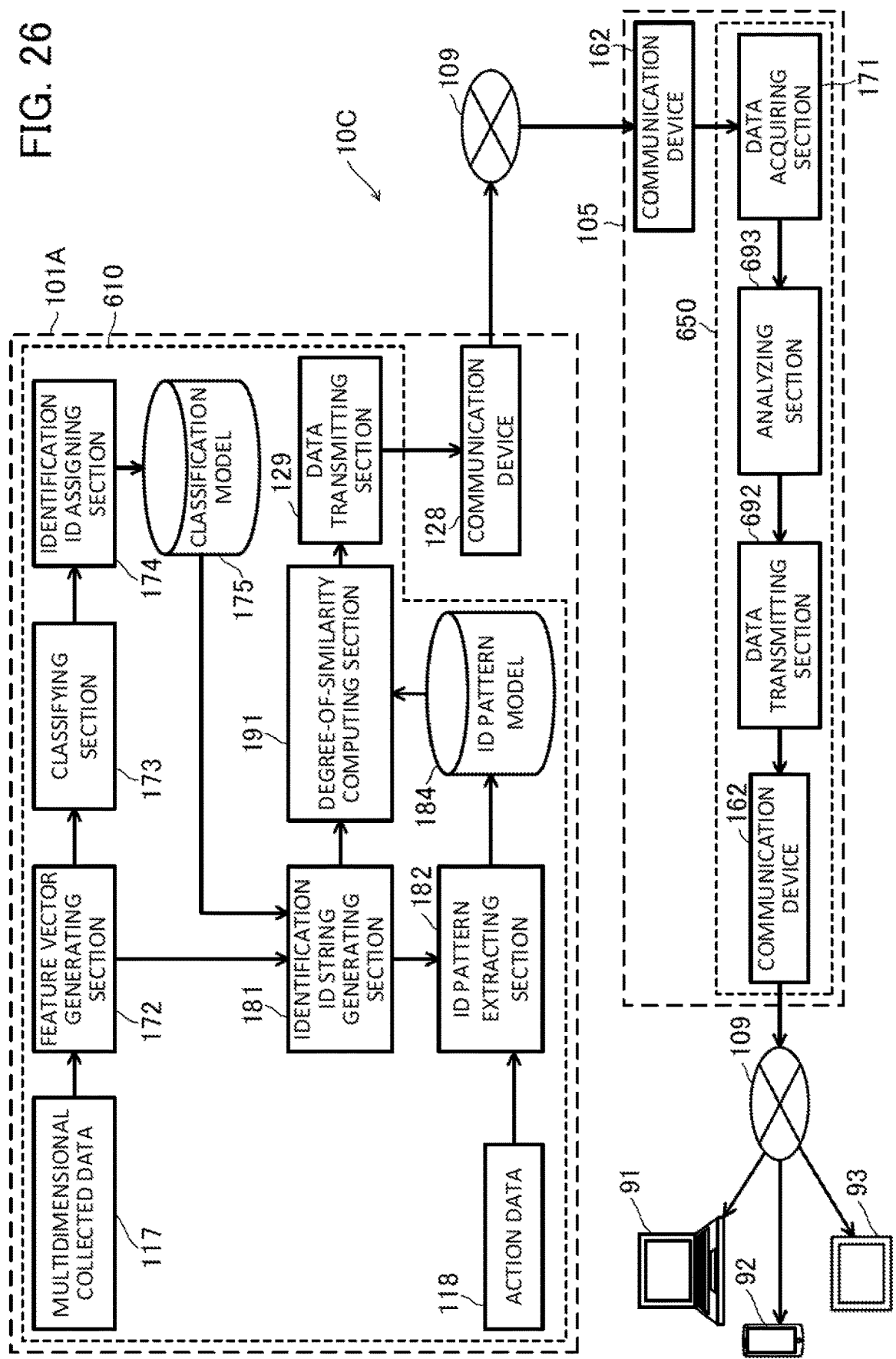
FIG. 26 is a functional block diagram of an action recognition system according to Modification 1-2.

FIG. 26, which is similar to FIG. 2, is a functional block diagram of an action recognition system 10C according to Modification 1-2. The present modification is different from the first embodiment in that a machine controller 610 of the hydraulic excavator 101A has a function to generate the classification model 175, a function to generate the identification ID table 185, and a function to generate the ID pattern model 184, and a management server 650 does not have those functions.

As illustrated in FIG. 26, the machine controller 610 of the hydraulic excavator 101A functions as the feature vector generating section 172, the classifying section 173, the identification ID allocating section 174, the identification ID string generating section 181, the ID pattern extracting section 182, the degree-of-similarity computing section 191, and the data transmitting section 129 by executing the programs stored in the ROM 112. The identification ID string generating section 181 generates the identification ID table 185 (see FIG. 8) based on the feature quantity data table 176 and the classification model 175 and stores the generated identification ID table 185 in the HDD 116. The ID pattern extracting section 182 generates the ID pattern model 184 based on the identification ID table 185 and the action data table 118 and stores the generated ID pattern model 184 in the HDD 116. The data transmitting section 129 transmits the degree of similarity computed by the degree-of-similarity computing section 191 from the communication device 128 via the communication link 109 to the management apparatus 105.

The management server 650 of the management apparatus 105 functions as the data acquiring section 171, an analyzing section 693, and a data transmitting section 692 by executing the programs stored in the ROM 152.

The data acquiring section 171 acquires the degree of similarity (data) computed by the degree-of-similarity computing section 191 from the hydraulic excavator 101A through the communication link 109 and stores the acquired data in the HDD 156.

The analyzing section 693 may include, for example, the action recognizing section 293 described in the second embodiment and Modification 1 of the second embodiment, and generates analyzing data for analyzing actions of the hydraulic excavator 101A, such as the accumulated occurrence counts of the actions and the occurrence frequencies of the actions. The data transmitting section 692 transmits the analyzing data from the communication device 162 through the communication link 109 to communication terminals 91, 92, and 93 owned by the user who analyzes the actions of the hydraulic excavator 101A, such as the maintenance worker or the like. The communication terminals 91, 92, and 93 display on their display screens display images (e.g., accumulated occurrence count images, occurrence frequency images) about the analyzing data by executing predetermined applications.

As described above, the action recognition system 10C according to the present modification has the machine controller (first controller) 610 that the hydraulic excavator 101A has and the management server (second controller) 650 that the management apparatus (external apparatus) 105 disposed outside of the hydraulic excavator 101A has. The machine controller 610 is able to execute a first information outputting process for computing, in a time division manner, feature vectors V where the information of the hydraulic excavator 101A that varies in a time sequence represents feature quantities, allocating identification IDs to the feature vectors V computed in the time division manner on the basis of the classification model 175, generating output information for recognizing a predetermined action on the basis of changes in the identification IDs in a time sequence and the ID pattern model 184, and transmitting the output information to the management apparatus 105. The management server 650 is able to execute a second information outputting process for outputting the output information from the communication device (output device) 162 to the communication terminals 91, 92, and 93. The present modification can reduce the volume of communication traffic compared with the first embodiment. The management server 650 may control the display device (output device) 165 to output the output information in the second information outputting process.

<Modification 1-3>

Although not shown, the machine controller 110 of the hydraulic excavator 101A may have the function of the output controlling section 390B described in Modification 1 of the third embodiment. In this case, the output controlling section 390B transmits action data of the hydraulic excavator 101A through the communication link 109 to the management apparatus 105. The management apparatus 105 controls the display device 165 to display the animation 367 of the hydraulic excavator 101A on the display screen 165a on the basis of the acquired action data. The action data transmitted from the hydraulic excavator 101A represent the postures 368a, 368c, and 368e illustrated in FIG. 22, and the management apparatus 105 preferably interpolates the action data representing the postures 368b and 368d according to the key frame method, so that those action data will be displayed on the display screen 165a of the display device 165. Accordingly, the volume of data transmitted from the hydraulic excavator 101A to the management apparatus 105 is reduced.

<Modification 2>

According to the above embodiments, the description has been made, by way of example, that the information of the work machine 101 is transmitted through the communication link 109 to the management apparatus 105. However, the present invention is not limited to such a feature. The information of the work machine 101 may be stored in a portable storage medium such as a memory card, and the information stored in the storage medium may be read by the management apparatus 105.

<Modification 3>

According to the first embodiment, the description has been made, by way of example, that the management apparatus 105 generates the information of a display image as output information for recognizing a predetermined action of the hydraulic excavator 101A and controls the display device 165 to display the display image on the display screen 165a. However, the present invention is not limited to such a feature. The management server 150 may generate the information of a print image as output information for recognizing a predetermined action of the hydraulic excavator 101A and control a printer as an output device to output the output information. In other words, the print image may be printed on a paper medium. Alternatively, the management server 150 may transmit (output) output information for recognizing a predetermined action of the hydraulic excavator 101A from the communication device 162 as an output device to a portable terminal such as a smartphone, a tablet PC, or a mobile phone. The owner of the portable terminal can thus operate the portable terminal to display the information for recognizing a predetermined action of the hydraulic excavator 101A on its display screen.

<Modification 4>

According to Modification 1 of the third embodiment, the description has been made, by way of example, that the action display image generating section 395B generates an action image corresponding to all identification IDs of the identification ID table 185, thereby generating the animation 367. However, the present invention is not limited to such a feature. An action image may be generated with respect to only an action recognized by the action recognizing section 293. If the action recognizing section 293 determines that an action according to a registered ID pattern "5"→"7"→"10" is performed with respect to an identification ID string "5"→"7"→"8"→"10" generated by the identification ID string generating section 181, then the action display image generating section 395B may generate an action image based on the registered ID pattern "5"→"7"→"10." In other words, an animation may be generated by omitting the action image of the identification ID "8."

<Modification 5>

According to the above embodiments, the description has been made, by way of example, that the multidimensional collected data table 117a, 117b for learning is generated by actual machine data of the hydraulic excavator 101A. However, the present invention is not limited to such a feature. A simulator for simulating an action of the hydraulic excavator 101A may be used to simulate the operation, and the multidimensional collected data table 117a, 117b for learning may be generated from the data of the simulated action.

<Modification 6>

According to the above embodiments, the description has been made, by way of example, that the work machine 101 includes the hydraulic excavator 101A, the dump truck 101B, or the work robot 101C. However, the present invention is not limited to such a feature. The present invention is also applicable to a work machine such as a wheel loader or a crawler crane. The present invention is not limited to work machines, but is also applicable to machines whose actions are variable in a time sequence.

While the embodiments of the present invention have been described above, the above embodiments represent merely certain applications of the present invention and should not be construed as limiting the technical scope of the invention to specific details of the embodiments.

DESCRIPTION OF REFERENCE CHARACTERS

4: Work implement
10, 10B, 10C: Action recognition system
101: Work machine
101A: Hydraulic excavator (machine)
101B: Dump truck (machine)
101C: Work robot (machine)
105: Management apparatus (external apparatus)
109: Communication link
110: Machine controller (first controller, controller)
117: Multidimensional collected data table
118: Action data table
121: Bottom pressure sensor (sensor)
122: Rod pressure sensor (sensor)
123: Boom operation sensor (sensor)
124: Boom angle sensor (posture sensor, sensor)
125: Temperature sensor (sensor)
128: Communication device (output device)
150: Management server (second controller, controller)

162: Communication device (output device)
165: Display device (output device)
166: Degree-of-similarity image
170: Classification model generating section
172: Feature vector generating section
173: Classifying section
174: Identification ID allocating section
175: Classification model
176: Feature quantity data table
180: ID pattern model generating section
181: Identification ID string generating section
182: ID pattern extracting section
184: ID pattern model
185: Identification ID table
190: Output controlling section
191: Degree-of-similarity computing section
192: Display controlling section (output controlling section)
290: Output controlling section
293: Action recognizing section
366g: Additional information image
366i: Fault risk image
366j: Accumulated occurrence count image
366k: Still image
367: Animation (moving image)
390, 390B: Output controlling section
392: Display controlling section
394: Additional information selecting section
395, 395B: Action display image generating section
396: Additional information data table
397: Action display database
490: Output controlling section
492: Display controlling section
498: Duration time measuring section
510: Machine controller (first controller)
550: Management server (second controller)
610: Machine controller (first controller)
650: Management server (second controller)
693: Analyzing section
C: Cost (degree of similarity)

The invention claimed is:

1. An action recognition system comprising:
a display device that outputs information; and
a controller that acquires information of a machine with respect to running that varies in a time sequence, generates output information for recognizing an action of the machine on a basis of the information of the machine, and controls the display device to output the output information, wherein
the controller is configured to be able to execute:
a classification model generating process for generating a classification model by computing, in a time division manner, a plurality of feature vectors using as feature quantities the information of the machine that varies in a time sequence, classifying the feature vectors computed in the time division manner into a plurality of clusters, and allocating identification IDs to the clusters;
an ID pattern model generating process for generating an ID pattern model by computing, in a time division manner, a plurality of feature vectors using as feature quantities the information of the machine that varies in a time sequence, allocating the identification IDs to the feature vectors computed in the time division manner on a basis of the classification model, and storing a pattern of the identification IDs that is an identification ID string of identification IDs arrayed in a time sequence according to a predetermined action of the machine in association with identification information of the predetermined action; and
an information outputting process for computing, in a time division manner, a plurality of feature vectors using as feature quantities the information of the machine that varies in a time sequence, allocating the identification IDs to the feature vectors computed in the time division manner on a basis of the classification model, generating output information for recognizing the predetermined action on a basis of an identification ID string of the identification IDs arrayed in a time sequence and the ID pattern model generated in advance, and controlling the display device to output the output information.

2. The action recognition system according to claim 1, wherein
the controller is configured to compute a degree of similarity between the identification ID string of the identification IDs arrayed in the time sequence and the ID pattern model for each of the identification information of the predetermined action, and generates changes in the degree of similarity in a time sequence for each of the identification information of the predetermined action as the output information in the information outputting process.

3. The action recognition system according to claim 1, wherein
the action recognition system includes a storage device storing therein additional information corresponding to the identification information, and
the controller generates the output information based on the identification information and the additional information and controls the display device to output the output information in the information outputting process.

4. The action recognition system according to claim 1, wherein
the controller is configured to compute number of times that the predetermined action has been performed on a basis of the changes in the identification IDs in the time sequence and the ID pattern model, generates the output information based on the computed number of times, and controls the display device to output the output information in the information outputting process.

5. The action recognition system according to claim 1, wherein
the controller is configured to compute at least either an occurrence frequency on a time axis of the predetermined action or an occurrence frequency thereof in a predetermined area on a basis of the changes in the identification IDs in the time sequence and the ID pattern model, generates the output information based on the computed occurrence frequency, and controls the display device to output the output information in the information outputting process.

6. The action recognition system according to claim 1, wherein
the controller generates action data of the machine on a basis of posture information of the machine used to compute the feature vectors and shape data of the machine and controls the display device to display an animation of the machine on a basis of the action data in the information outputting process.

7. The action recognition system according to claim 1, wherein
the controller generates action data by interpolating data between key frames generated according to the changes in the identification IDs in the time sequence, the key frames being represented by the feature vectors corresponding to the identification IDs, and controls the display device to display an animation of the machine on a basis of the action data in the information outputting process.

8. The action recognition system according to claim 1, wherein
the controller controls the display device to display a still image generated on a basis of the feature vectors corresponding to the identification IDs in the information outputting process.

9. The action recognition system according to claim 1, wherein
the controller is configured to compute a duration time of the predetermined action on a basis of the changes in the identification IDs in the time sequence and the ID pattern model, generates the output information based on the computed duration time, and controls the display device to output the output information in the information outputting process.

10. The action recognition system according to claim 1, wherein
the machine includes a work machine having a work implement and has a plurality of sensors, and
the controller uses as the feature quantities physical quantities computed from a plurality of different kinds of physical quantities sensed by the sensors.

11. The action recognition system according to claim 1, wherein
the machine includes a work machine having a work implement,
the controller has a first controller that the work machine has and a second controller that an external apparatus disposed outside of the work machine has,
the first controller is configured to be able to execute a first information outputting process for computing, in a time division manner, a plurality of feature vectors using as feature quantities the information of the work machine that varies in a time sequence, allocating the identification IDs to the feature vectors computed in the time division manner on a basis of the classification model, and transmitting information of an identification ID string representing the changes in the identification IDs in the time sequence to the external apparatus, and
the second controller is able to execute a second information outputting process for generating output information for recognizing the predetermined action on a basis of the changes in the identification IDs in the time sequence and the ID pattern model, and controlling the display device to output the output information.

12. The action recognition system according to claim 1, wherein
the machine includes a work machine having a work implement,
the controller has a first controller that the work machine has and a second controller that an external apparatus disposed outside of the work machine has,
the first controller is configured to be able to execute a first information outputting process for computing, in a time division manner, a plurality of feature vectors using as feature quantities the information of the work machine that varies in a time sequence, allocating the identification IDs to the feature vectors computed in the time division manner on a basis of the classification model, generating output information for recognizing the predetermined action on a basis of the changes in the identification IDs in the time sequence and the ID pattern model, and transmitting the output information to the external apparatus, and
the second controller is able to execute a second information outputting process for controlling the display device to output the output information.

* * * * *